United States Patent
Narayanan

(10) Patent No.: US 12,512,088 B2
(45) Date of Patent: Dec. 30, 2025

(54) METHOD AND SYSTEM FOR USER-INTERFACE ADAPTATION OF TEXT-TO-SPEECH SYNTHESIS

(71) Applicant: GOOGLE LLC, Mountain View, CA (US)

(72) Inventor: Ajit Narayanan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 201 days.

(21) Appl. No.: 17/914,033

(22) PCT Filed: Jun. 3, 2020

(86) PCT No.: PCT/US2020/035861
§ 371 (c)(1),
(2) Date: Sep. 23, 2022

(87) PCT Pub. No.: WO2021/247012
PCT Pub. Date: Dec. 9, 2021

(65) Prior Publication Data
US 2023/0122824 A1    Apr. 20, 2023

(51) Int. Cl.
*G10L 13/02* (2013.01)
*G10L 13/08* (2013.01)

(52) U.S. Cl.
CPC .............. *G10L 13/02* (2013.01); *G10L 13/08* (2013.01)

(58) Field of Classification Search
CPC ......... G10L 13/02; G10L 13/08; G10L 13/06; G10L 2013/105; G10L 13/033
See application file for complete search history.

(56) References Cited

U.S. PATENT DOCUMENTS

| | | | |
|---|---|---|---|
| 7,305,342 B2 * | 12/2007 | Shizuka | H04M 3/5307 379/88.16 |
| 10,276,149 B1 | 4/2019 | Liang et al. | |
| 10,649,726 B2 * | 5/2020 | Kalisky | G10L 13/00 |
| 2005/0071163 A1 | 3/2005 | Aaron et al. | |

(Continued)

FOREIGN PATENT DOCUMENTS

| | | |
|---|---|---|
| CN | 1938756 A | 3/2007 |
| CN | 101064103 A | 10/2007 |

(Continued)

OTHER PUBLICATIONS

The International Search Report (ISR) with Written Opinion for PCT/US2020/035861 dated Feb. 12, 2021, pp. 1-18.

(Continued)

*Primary Examiner* — Richemond Dorvil
*Assistant Examiner* — Zeeshan Mahmood Shaikh
(74) *Attorney, Agent, or Firm* — McDonnell Boehnen Hulbert & Berghoff LLP

(57) ABSTRACT

A method and system is disclosed for adapting speech synthesis according to user-interface input. While synthesizing speech from a text segment with a text-to-speech (TTS) system and concurrently displaying the text segment in a display device, the system may receive tracking operation input tracking a portion of text undergoing synthesis and identifying a context portion of the text for which prior-synthesized speech has been synthesized at a canonical speech-pace. The tracking information may be used to adjust a speech-pace of TTS synthesis of the portion from the canonical speech-pace to an adapted speech-pace, and speech characteristics of synthesized speech of the portion may be adapted by applying both the adapted speech-pace and synthesized speech characteristics of the prior-synthesized speech of the context portion to TTS synthesis processing of the portion. The synthesized speech of the iden- (Continued)

tified portion may be output at the adapted speech-pace and with the adapted speech characteristics.

20 Claims, 9 Drawing Sheets

(56) References Cited

U.S. PATENT DOCUMENTS

| | | | |
|---|---|---|---|
| 2008/0109225 A1 | 5/2008 | Sato | |
| 2009/0313020 A1* | 12/2009 | Koivunen | G06F 3/04847 |
| | | | 704/260 |
| 2011/0050594 A1* | 3/2011 | Kim | G06F 3/04847 |
| | | | 345/173 |
| 2011/0288861 A1* | 11/2011 | Kurzweil | G09B 5/062 |
| | | | 704/E15.044 |
| 2019/0198039 A1 | 6/2019 | Breedvelt-Schouten | |
| 2020/0027440 A1* | 1/2020 | Kilgore | G10L 13/0335 |

FOREIGN PATENT DOCUMENTS

| | | |
|---|---|---|
| CN | 101685633 A | 3/2010 |
| CN | 102201233 A | 9/2011 |
| CN | 108509136 A | 9/2018 |
| CN | 108962217 A | 12/2018 |
| CN | 109686359 A | 4/2019 |

OTHER PUBLICATIONS

Schiavo, Gianluca et al. "Gary: Combining speech synthesis and eye tracking to support struggling readers" Proceedings The 14th International Conference on Mobile and Ubiquitous Multimedia (2015), pp. 417-421.

Edgington, M. et al. "Overview of current text-to-apeech techniques: Part II—prosody and speech generation" Technology Journal (1996) vol. 14(1), pp. 84-89.

* cited by examiner

METHOD AND SYSTEM FOR USER-INTERFACE ADAPTATION OF TEXT-TO-SPEECH SYNTHESIS

CROSS REFERENCE TO RELATED APPLICATIONS

The present application is a national stage entry of, and claims priority to, PCT/US2020/35861, filed on Jun. 3, 2020, which is hereby incorporated in its entirety herein by reference.

BACKGROUND

Unless otherwise indicated herein, the materials described in this section are not prior art to the claims in this application and are not admitted to be prior art by inclusion in this section.

A goal of automatic speech recognition (ASR) technology is to map a particular utterance, or speech sample, to an accurate textual representation, or other symbolic representation, of that utterance. For instance, ASR performed on the utterance "my dog has fleas" would ideally be mapped to the text string "my dog has fleas," rather than the nonsensical text string "my dog has freeze," or the reasonably sensible but inaccurate text string "my bog has trees."

A goal of speech synthesis technology is to convert written language into speech that can be output in an audio format, for example directly or stored as an audio file suitable for audio output. This speech synthesis can be performed by a text-to-speech (TTS) system. The written language could take the form of text, or symbolic linguistic representations. The speech may be generated as a waveform by a speech synthesizer, which produces artificial human speech. Natural sounding human speech may also be a goal of a speech synthesis system.

Various technologies, including computers, network servers, telephones, and personal digital assistants (PDAs), can be employed to implement an ASR system and/or a speech synthesis system, or one or more components of such systems. Communication networks may in turn provide communication paths and links between some or all of such devices, supporting speech synthesis system capabilities and services that may utilize ASR and/or speech synthesis system capabilities.

BRIEF SUMMARY

In one aspect, an example embodiment presented herein provides a method comprising: while synthesizing speech from a text segment with a text-to-speech (TTS) system and concurrently displaying the text segment in a display device, receiving input indicating a position and motion of a tracking operation relative to the displayed text segment in the display device; using the indicated position of the tracking operation to identify both a portion of the text segment undergoing TTS synthesis processing at a time proximate to when the tracking operation input is received, and a context portion of the text segment for which prior-synthesized speech has been synthesized at a canonical speech-pace by the TTS system, wherein the context portion includes text immediately before and immediately following the identified portion; using the indicated motion of the tracking operation to adjust a speech-pace of TTS synthesis of the identified portion from the canonical speech-pace to an adapted speech-pace determined based on the indicated motion; adapting speech characteristics of synthesized speech of the identified portion by applying to TTS synthesis processing of the identified portion both the adapted speech-pace and synthesized speech characteristics of the prior-synthesized speech of the context portion; and outputting the synthesized speech of the identified portion at the adapted speech-pace and with the adapted speech characteristics. In some embodiments, it may be optional for identification of the portion of the text undergoing TTS synthesis processing to be made at a time proximate to when the tracking operation input is received or at a location proximate to the indicated position. The tracking operation may indicate or comprise a change in an indicator of a position of (user) input or potential input, and may be associated with a visual indicator (though not necessarily). For example, when a user input is touch input (or stylus input) the tracking operation may indicate a change in touch input; the touch input may not necessarily be rendered on the display device, but there may still be a visual indicator (in the form of the finger or stylus) indicating the position of the user input for the tracking operation. When the user input is via a physical input device (such as a mouse or a keyboard), the indicator may be a moveable visible indicator, such as a rendered pointer. In the following description, an indicator associated with the tracking operation may be referred to by the terms virtual pointing indicator and/or "cursor," which terms encompass both visual (rendered and physical) and other non-visual indicators of a position of user input or for potential user input; the position and motion of the tracking operation may then be received as part of a virtual pointing indicator input or "cursor input," for use in the methods description herein. For example, as a user moves their finger (either along a touch screen or in front of a gesture based interface) or moves a mouse, the position and motion of the indicator relative to the text segment displayed on the display device can be provided as input (such as the virtual pointing indicator or cursor input) indicating the tracking operation.

In another respect, an example embodiment presented herein provides a system including a text-to-speech (TTS) system comprising: one or more processors; memory; and machine-readable instructions stored in the memory, that upon execution by the one or more processors cause the system to carry out operations including: while synthesizing speech from a text segment with the TTS system and concurrently displaying the text segment in a display device, receiving input indicating a position and motion of a tracking operation relative to the displayed text segment in the display device; using the indicated position of the tracking operation to identify both a portion of the text segment undergoing TTS synthesis processing at a time proximate to when the tracking operation input is received, and a context portion of the text segment for which prior-synthesized speech has been synthesized at a canonical speech-pace by the TTS system, wherein the context portion includes text immediately before and immediately following the identified portion; using the indicated motion of the tracking operation to adjust a speech-pace of TTS synthesis of the identified portion from the canonical speech-pace to an adapted speech-pace determined based on the indicated motion; adapting speech characteristics of synthesized speech of the identified portion by applying to TTS synthesis processing of the identified portion both the adapted speech-pace and synthesized speech characteristics of the prior-synthesized speech of the context portion; and outputting the synthesized speech of the identified portion at the adapted speech-pace and with the adapted speech characteristics. In some embodiments, it may be optional for identification of the portion of the text undergoing TTS synthesis processing to be made at a time proximate to when the tracking operation input is received or at a location proximate to the indicated position. This system can be configured to perform any of the methods described or claimed herein.

In yet another aspect, an example embodiment presented herein provides an article of manufacture including a computer-readable storage medium having stored thereon program instructions that, upon execution by one or more processors of a system including a text-to-speech (TTS) system, cause the system to perform operations comprising: while synthesizing speech from a text segment with the TTS system and concurrently displaying the text segment in a display device, receiving input indicating a position and motion of a tracking operation relative to the displayed text segment in the display device; using the indicated position of the tracking operation to identify both a portion of the text segment undergoing TTS synthesis processing at a time proximate to when the tracking operation input is received, and a context portion of the text segment for which prior-synthesized speech has been synthesized at a canonical speech-pace by the TTS system, wherein the context portion includes text immediately before and immediately following the identified portion; using the indicated motion of the tracking operation to adjust a speech-pace of TTS synthesis of the identified portion from the canonical speech-pace to an adapted speech-pace determined based on the indicated motion; adapting speech characteristics of synthesized speech of the identified portion by applying to TIS synthesis processing of the identified portion both the adapted speech-pace and synthesized speech characteristics of the prior-synthesized speech of the context portion; and outputting the synthesized speech of the identified portion at the adapted speech-pace and with the adapted speech characteristics. In some embodiments, it may be optional for identification of the portion of the text undergoing TTS synthesis processing to be identified at a time proximate to when the tracking operation input is received or at a location proximate to the indicated position. In some embodiments, it may be optional for identification of the portion of the text undergoing TTS synthesis processing to be made at a time proximate to when the tracking operation input is received or at a location proximate to the indicated position. A computer program may also be provided, the computer program comprising instructions that, when executed by one or more processors, cause the one or more processors to perform any of the methods described or claimed herein.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1:
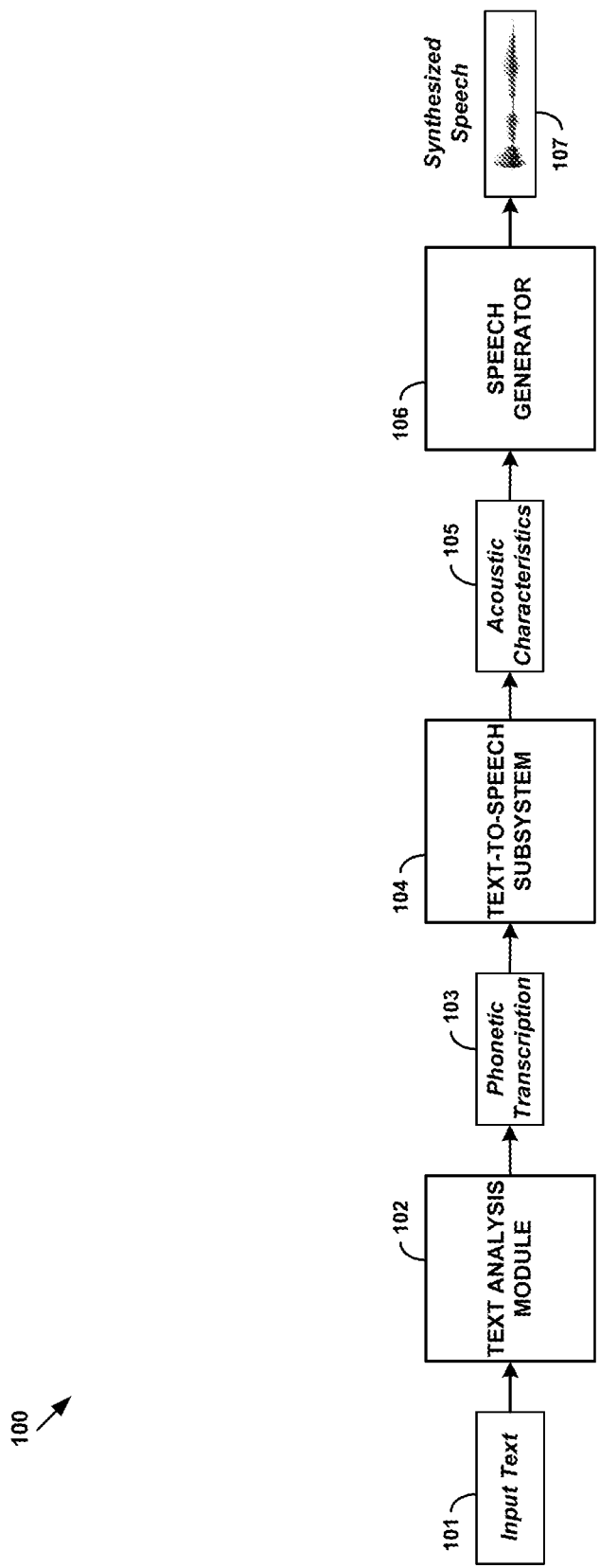
FIG. 1 depicts a simplified block diagram of an example text-to-speech system, in accordance with an example embodiment.

A speech synthesis system can be a processor-based system configured to convert written language into artificially produced speech or spoken language. The written language could be written text, such as one or more written sentences or text strings, for example. The written language could also take the form of other symbolic representations, such as a speech synthesis mark-up language, which may include information indicative of speaker emotion, speaker gender, speaker identification, as well as speaking styles. The source of the written text could be input from a keyboard or keypad of a computing device, such as a portable computing device (e.g., a PDA, smartphone, etc.), or could be from a file stored on one or another form of computer readable storage medium. The artificially produced speech could be generated as a waveform from a signal generation device or module (e.g., a speech synthesizer device), and output by an audio playout device and/or formatted and recorded as an audio file on a tangible recording medium. Such a system may also be referred to as a "text-to-speech" (ITS) system, although the written form may not necessarily be limited to only text.

A speech synthesis system may operate by receiving input text (or other form of written language), and translating the written text into a "phonetic transcription" corresponding to a symbolic representation of how the spoken rendering of the text sounds or should sound. The phonetic transcription may then be mapped to speech features that parameterize an acoustic rendering of the phonetic transcription, and which then serve as input data to a signal generation module device or element that can produce an audio waveform suitable for playout by an audio output device. The playout may sound like a human voice speaking the words (or sounds) of the input text string, for example. In the context of speech synthesis, the more natural the sound (e.g., to the human ear) of the synthesized voice, generally the better the voice-quality ranking of the system. A more natural sound can also reduce computational resources in some cases, since subsequent exchanges with a user to clarify the meaning of the output can be reduced. The audio waveform could also be generated as an audio file that may be stored or recorded on storage media suitable for subsequent playout.

In operation, a TTS system may be used to convey information from an apparatus (e.g. a processor-based device or system) to a user, such as messages, prompts, answers to questions, instructions, news, emails, and speech-to-speech translations, among other information. Speech signals may themselves carry various forms or types of information, including linguistic content, affectual state (e.g., emotion and/or mood), physical state (e.g., physical voice characteristics), and speaker identity, to name a few.

In example embodiments, speech synthesis may use parametric representations of speech with symbolic descriptions of phonetic and linguistic content of text. A TTS system may be trained using data consisting mainly of numerous speech samples and corresponding text strings (or other symbolic renderings). For practical reasons, the speech samples are usually recorded, although they need not be in principle. By construction, the corresponding text strings are in, or generally accommodate, a written storage format. Recorded speech samples and their corresponding text strings can thus constitute training data for a TTS system.

One example of a TTS is based on hidden Markov models (HMMs). In this approach, HMMs are used to model statistical probabilities associating phonetic transcriptions of input text strings with parametric representations of the corresponding speech to be synthesized. As another example, a TTS may be based on some form of machine learning to generate a parametric representation of speech to synthesize speech. For example, an artificial neural network (ANN) may be used to generate speech parameters by training the ANN to associate known phonetic transcriptions with known parametric representations of speech sounds. Both HMM-based speech synthesis and ANN-based speech synthesis can facilitate altering or adjusting characteristics of the synthesized voice using one or another form of statistical adaptation. Other forms of TTS systems are possible as well.

One area of TTS and audio applications that is of interest is related to human learning. In particular, it is known that some individuals tend to be "visual learners" while some others prefer the auditory modality to absorb information. The advent and popularity of audiobooks is an example of a market that serves individuals who prefer things heard rather than read. TTS may also be used as an accommodation for users with reduced literacy, or with disabilities such as dyslexia.

The inventor has recognized that the conversion of text into audio through TTS can pose a number of challenges relating to usability, particularly when applied in a human learning context. Two particular usability issues relate to reduced attention, due to factors of human physiology, and to linearity. Briefly, some users who consume a piece of text content auditorily through TTS have reported a reduction in concentration when compared with reading. This appears to be because listening may be considered a more passive form of engagement than reading, requiring diminished user interaction with the audio generator once it has been started. Conventional TTS-based audio systems do not have interactivity incorporated by design within the TTS processing and synthesis. Instead, conventional systems may offer simple start-stop-volume-scrub controls, for example.

Linearity describes the generally straight "read-through" user interface (UI) imposed by conventional TTS audio. Conventional TTS systems offer limited ability to perform the equivalent of "re-reading." While users may be able to scrub (or jump) back and forth in an audio work (for example, swiping left on a touch-screen system to go back 10 seconds), the granularity of control in conventional TTS systems typically does not match the fine-grained, natural experience that they would have when reading, where they may re-read and re-parse a tricky portion of a sentence, or go back one phrase, or re-read a sentence to help understand it better.

To the extent that conventional TTS systems have capabilities that provide any degree at all of UI control of TTS, these capabilities typically fall well short of being able to generate speech that sounds natural in terms of tone and pace, among other perceivable audio characteristics. For example, human-recorded text-to-speech provides recordings generally cannot be pace-adjusted without pitch distortion (e.g., deepening voice pitch for slowed pace, and vice versa). And conventional TTS synthesis systems similarly lack UI controls that integrate with speech synthesis algorithms that synthesize speech from text, typically resulting in unnatural sounding speech.

To address these and other challenges, the inventor has devised techniques for adapting synthesis of speech that overcome the problems described above, among others, and thereby provide for improved reading and learning comprehension of users consuming text through a text-to-speech interface. Accordingly, example embodiments described herein provide systems and methods that employ technologies such as machine learning to deliver effective UI adaptation of synthesized speech and enhanced audio-plus-text experiences to users.

In accordance with example embodiments, position and motion of an indicator, such as a cursor or other visually rendered pointer, that tracks text displayed in a display device may serve as input to a TTS system that is synthesizing speech from the displayed text. In some embodiments, the indicator, or tracking indicator, may not necessarily have a visually rendered icon or graphic, though it still tracks the displayed text. More particularly, a "tracking operation" may provide as input to the TTS system the position and motion of the indicator relative to a portion or segment of displayed text as the portion or segment is being processed and synthesized into speech by the TTS system. The tracking operation may be a user tracking operation. The tracking operation may take various forms. Non-limiting examples include a graphically rendered cursor or pointer under interactive control of a computer mouse device or other interactive tracking device; a user's finger providing haptic input as it moves across a touch-screen device; a virtual pointer following a pre-programmed path across or through the displayed text at a pre-programmed pace; and input indicating a virtual projection onto the displayed text of eye-gaze direction and motion of a user derived from an eye-tracking means, such as an eye-tracking camera on a interactive virtual and/or augmented reality glasses (or other interactive head-mounted display device). The input position and motion may be integrated into the speech synthesis process in a manner that adapts feedback of the synthesis processing so as to cause generation of synthesized speech that both conforms to the tracking information, while remaining faithful to the phonetic and prosodic context of the tracked text being rendered into synthesized speech. The generated or synthesized speech may thus map to the user's input, improving the match between the user's expected output and the actual output and preventing dissonance for the user. The audio output generated as described herein may therefore be provided to a user in a manner which improves the user's physiological reaction.

2. Example Text-to-Speech System

A TTS synthesis system (or more generally, a speech synthesis system) may operate by receiving input text, processing the text into a symbolic representation of the phonetic and linguistic content of the text string, generating a sequence of speech features corresponding to the symbolic representation, and providing the speech features as input to a speech synthesizer in order to produce a spoken rendering of the input text. The symbolic representation of the phonetic and linguistic content of the text may take the form of a sequence of labels, each label identifying a phonetic speech unit, such as a phoneme, and further identifying or encoding linguistic and/or syntactic context, temporal parameters, and other information for specifying how to render the symbolically-represented sounds as meaningful speech in a given language. Other speech characteristics may include pitch, frequency, speaking pace, and intonation (e.g., statement tone, question tone, etc.). At least some of these characteristics are sometimes referred to as "prosody."

In accordance with example embodiments, the phonetic speech units of a phonetic transcription could be phonemes. A phoneme may be considered to be the smallest acoustic segment of speech of a given language that encompasses a meaningful contrast with other speech segments of the given language. Thus, a word typically includes one or more phonemes. For purposes of simplicity, phonemes may be thought of as utterances of letters, although this is not a perfect analogy, as some phonemes may present multiple letters. In written form, phonemes are typically represented as one or more letters or symbols within some type of delimiter that signifies the text as representing a phoneme. As an example, the phonemic spelling for the American English pronunciation of the word "cat" is /k/ /ae/ /t/, and consists of the phonemes /k/, /ae/, and /t/. Another example is the phonemic spelling for the word "dog" is /d/ /aw/ /g/, consisting of the phonemes /d/, /aw/, and/g/. Different phonemic alphabets exist, and other phonemic representations are possible. Common phonemic alphabets for American English contain about 40 distinct phonemes. Other languages may be described by different phonemic alphabets containing different phonemes.

The phonetic properties of a phoneme in an utterance can depend on, or be influenced by, the context in which it is (or is intended to be) spoken. For example, a "triphone" is a triplet of phonemes in which the spoken rendering of a given phoneme is shaped by a temporally-preceding phoneme, referred to as the "left context," and a temporally-subsequent phoneme, referred to as the "right context." Thus, the ordering of the phonemes of English-language triphones corresponds to the direction in which English is read. Other phoneme contexts, such as quinphones, may be considered as well.

Speech features represent acoustic properties of speech as parameters, and in the context of speech synthesis, may be used for driving generation of a synthesized waveform corresponding to an output speech signal. Generally, features for speech synthesis account for three major components of speech signals, namely spectral envelopes that resemble the effect of the vocal tract, excitation that simulates the glottal source, and, as noted, prosody, which describes pitch contour ("melody") and tempo (rhythm). In practice, features may be represented in multidimensional feature vectors that correspond to one or more temporal frames. One of the basic operations of a TTS synthesis system is to map a phonetic transcription (e.g., a sequence of labels) to an appropriate sequence of feature vectors.

By way of example, the features may include Mel Filter Cepstral Coefficients (MFCC) coefficients. MFCC may represent the short-term power spectrum of a portion of an input utterance, and may be based on, for example, a linear cosine transform of a log power spectrum on a nonlinear Mel scale of frequency. (A Mel scale may be a scale of pitches subjectively perceived by listeners to be about equally distant from one another, even though the actual frequencies of these pitches are not equally distant from one another.)

In some embodiments, a feature vector may include MFCC, first-order cepstral coefficient derivatives, and second-order cepstral coefficient derivatives. For example, the feature vector may contain 13 coefficients, 13 first-order derivatives ("delta"), and 13 second-order derivatives ("delta-delta"), therefore having a length of 39. However, feature vectors may use different combinations of features in other possible embodiments. As another example, feature vectors could include Perceptual Linear Predictive (PLP) coefficients, Relative Spectral (RASTA) coefficients, Filter-bank log-energy coefficients, or some combination thereof. Each feature vector may be thought of as including a quantified characterization of the acoustic content of a corresponding temporal frame of the utterance (or more generally of an audio input signal).

FIG. 1 depicts a simplified block diagram of an example text-to-speech (TTS) synthesis system 100, in accordance with an example embodiment. In addition to functional components, FIG. 1 also shows selected example inputs, outputs, and intermediate products of example operation. The functional components of the TTS synthesis system 100 include a text analysis module 102 for converting input text 101 into a phonetic transcription 103, a TTS subsystem 104 for generating data representing acoustic characteristics 105 of the to-be-synthesized speech from the phonetic transcription 103, and a speech generator 106 to generate the synthesized speech 107 from the acoustic characteristics 105. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

It should be noted that the discussion in this section, and the accompanying figures, are presented for purposes of example. For example, the TTS subsystem 104 could be implemented using an HMM model for generating speech features at run-time based on learned (trained) associations between known labels and known parameterized speech. As another example, the TTS subsystem 104 could be implemented using a machine-learning model, such as an artificial neural network (ANN), for generating speech features at run-time from associations between known labels and known parameterized speech, where the associations are learned through training with known associations. In still another example, a TTS subsystem could employ a hybrid HMM-ANN model.

In accordance with example embodiments, the text analysis module 102 may receive input text 101 (or other form of text-based input) and generate a phonetic transcription 103 as output. The input text 101 could be a text message, email, chat input, book passage, article, or other text-based communication, for example. As described above, the phonetic transcription could correspond to a sequence of labels that identify speech units, such as phonemes, possibly as well as context information.

As shown, the TTS subsystem 104 may employ HMM-based or ANN-based speech synthesis to generate feature vectors corresponding to the phonetic transcription 103. The feature vectors may include quantities that represent acoustic characteristics 105 of the speech to be generated. For example, the acoustic characteristics may include pitch, fundamental frequency, pace (e.g., speed of speech), and prosody. Other acoustic characteristics as possible as well.

The acoustic characteristics may be input to the speech generator 106, which generates that synthesized speech 107 as output. The synthesize speech 107 could be generated as actual audio output, for example from an audio device having a speaker or speakers (e.g., headphones, ear-buds, or loudspeaker, or the like), and/or as digital data that may be recorded and played out from a data file (e.g., a wave file, or the like).

This high-level description of an example TTS system may be useful for providing context for the description of TTS synthesis with user-interface input for adapting how speech is synthesized. First, a discussion of an example communication system and device architecture in which example embodiments of TTS synthesis with user-interface adaptation may be implemented is presented.

3. Example Communication System and Device Architecture

Methods in accordance with an example embodiment, such as the one described above, devices, could be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

a. Example Communication System

Figure 2:
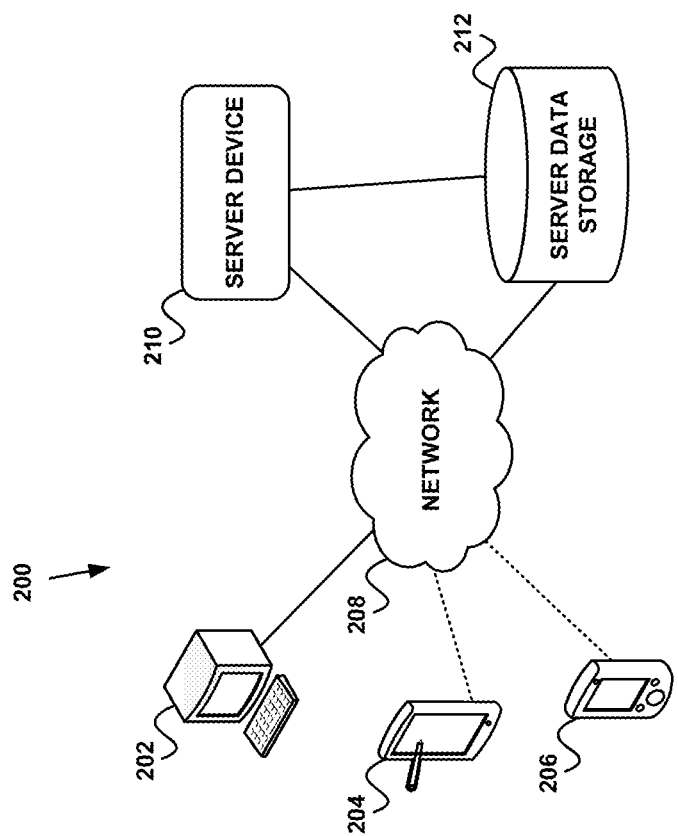
FIG. 2 is a block diagram of an example network and computing architecture, in accordance with an example embodiment.

FIG. 2 is a simplified block diagram of a communication system 200, in which various embodiments described herein can be employed. Communication system 200 includes client devices 202, 204, and 206, which represent a desktop personal computer (PC), a tablet computer, and a mobile phone, respectively. Client devices could also include wearable computing devices, such as head-mounted displays and/or augmented reality displays, for example. Each of these client devices may be able to communicate with other devices (including with each other) via a network 208 through the use of wireline connections (designated by solid lines) and/or wireless connections (designated by dashed lines).

Network 208 may be, for example, the Internet, or some other form of public or private Internet Protocol (IP) network. Thus, client devices 202, 204, and 206 may communicate using packet-switching technologies. Nonetheless, network 208 may also incorporate at least some circuit-switching technologies, and client devices 202, 204, and 206 may communicate via circuit switching alternatively or in addition to packet switching.

A server device 210 may also communicate via network 208. In particular, server device 210 may communicate with client devices 202, 204, and 206 according to one or more network protocols and/or application-level protocols to facilitate the use of network-based or cloud-based computing on these client devices. Server device 210 may include integrated data storage (e.g., memory, disk drives, etc.) and may also be able to access a separate server data storage 212. Communication between server device 210 and server data storage 212 may be direct, via network 208, or both direct and via network 208 as illustrated in FIG. 2. Server data storage 212 may store application data that is used to facilitate the operations of applications performed by client devices 202, 204, and 206 and server device 210.

Although only three client devices, one server device, and one server data storage are shown in FIG. 2, communication system 200 may include any number of each of these components. For instance, communication system 200 may comprise millions of client devices, thousands of server devices and/or thousands of server data storages. Furthermore, client devices may take on forms other than those in FIG. 2.

b. Example Server Device and Server System

Figure 3A:
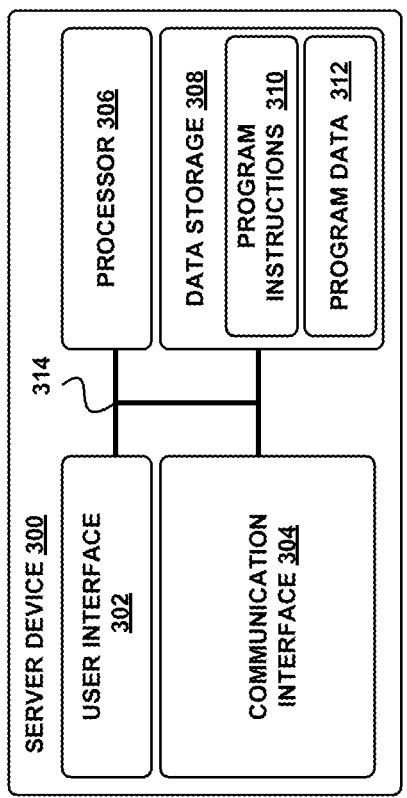
FIG. 3A is a block diagram of a server device, in accordance with an example embodiment.

FIG. 3A is a block diagram of a server device in accordance with an example embodiment. In particular, server device 300 shown in FIG. 3A can be configured to perform one or more functions of server device 210 and/or server data storage 212. Server device 300 may include a user interface 302, a communication interface 304, processor 306, and data storage 308, all of which may be linked together via a system bus, network, or other connection mechanism 314.

User interface 302 may comprise user input devices such as a keyboard, a keypad, a touch screen, a computer mouse, a track ball, a joystick, and/or other similar devices, now known or later developed. User interface 302 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 302 may be configured to generate audible output(s), via a speaker, speaker jack, audio output port, audio output device, earphones, and/or other similar devices, now known or later developed. In some embodiments, user interface 302 may include software, circuitry, or another form of logic that can transmit data to and/or receive data from external user input/output devices.

Communication interface 304 may include one or more wireless interfaces and/or wireline interfaces that are configurable to communicate via a network, such as network 208 shown in FIG. 2. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE)transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 304 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 306 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 306 may be configured to execute computer-readable program instructions 310 that are contained in data storage 308, and/or other instructions, to carry out various functions described herein.

Data storage 308 may include one or more non-transitory computer-readable storage media that can be mad or accessed by processor 306. The one or more computer-readable storage media may include volatile and/or non-volatile storage components, such as optical, magnetic, organic or other memory or disc storage, which can be integrated in whole or in part with processor 306. In some embodiments, data storage 308 may be implemented using a single physical device (e.g., one optical, magnetic, organic or other memory or disc storage unit), while in other embodiments, data storage 308 may be implemented using two or more physical devices.

Data storage 308 may also include program data 312 that can be used by processor 306 to carry out functions described herein. In some embodiments, data storage 308 may include, or have access to, additional data storage components or devices (e.g., cluster data storages described below).

Referring again briefly to FIG. 2, server device 210 and server data storage device 212 may store applications and application data at one or more locales accessible via network 208. These locales may be data centers containing numerous servers and storage devices. The exact physical location, connectivity, and configuration of server device 210 and server data storage device 212 may be unknown and/or unimportant to client devices. Accordingly, server device 210 and server data storage device 212 may be referred to as "cloud-based" devices that are housed at various remote locations. One possible advantage of such "cloud-based" computing is to offload processing and data storage from client devices, thereby simplifying the design and requirements of these client devices.

In some embodiments, server device 210 and server data storage device 212 may be a single computing device residing in a single data center. In other embodiments, server device 210 and server data storage device 212 may include multiple computing devices in a data center, or even multiple computing devices in multiple data centers, where the data centers are located in diverse geographic locations. For example, FIG. 2 depicts each of server device 210 and server data storage device 212 potentially residing in a different physical location.

Figure 3B:
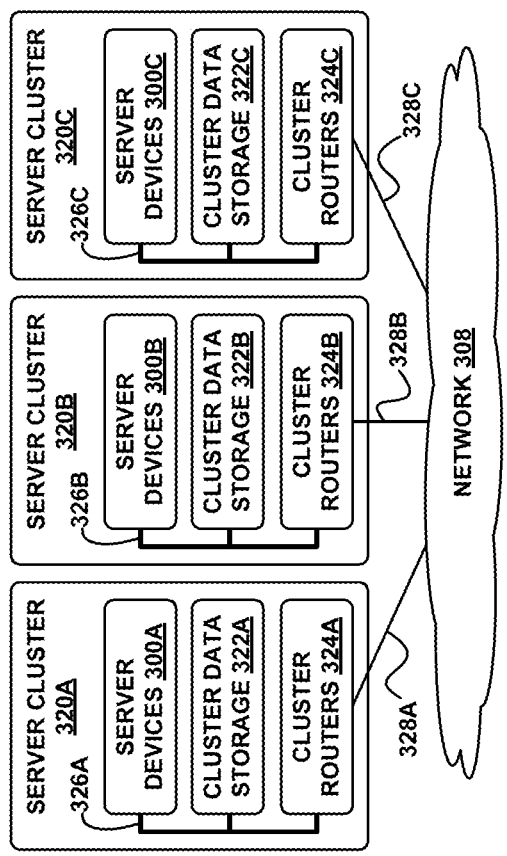
FIG. 3B depicts a cloud-based server system, in accordance with an example embodiment.

FIG. 3B depicts an example of a cloud-based server cluster. In FIG. 3B, functions of server device 210 and server data storage device 212 may be distributed among three server clusters 320A, 320B, and 320C. Server cluster 320A may include one or more server devices 300A, cluster data storage 322A, and cluster routers 324A connected by a local cluster network 326A. Similarly, server cluster 320B may include one or more server devices 300B, cluster data storage 322B, and cluster routers 324B connected by a local cluster network 326B. Likewise, server cluster 320C may include one or more server devices 300C, cluster data storage 322C, and cluster routers 324C connected by a local cluster network 326C. Server clusters 320A, 320B, and 320C may communicate with network 308 via communication links 328A, 328B, and 328C, respectively.

In some embodiments, each of the server clusters 320A, 320B, and 320C may have an equal number of server devices, an equal number of cluster data storages, and an equal number of cluster routers. In other embodiments, however, some or all of the server clusters 320A, 320B, and 320C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 320A, for example, server devices 300A can be configured to perform various computing tasks of a server, such as server device 210. In one embodiment, these computing tasks can be distributed among one or more of server devices 300A. Server devices 300B and 300C in server clusters 320B and 320C may be configured the same or similarly to server devices 300A in server cluster 320A. On the other hand, in some embodiments, server devices 300A, 300B, and 300C each may be configured to perform different functions. For example, server devices 300A may be configured to perform one or more functions of server device 210, and server devices 300B and server device 300C may be configured to perform functions of one or more other server devices. Similarly, the functions of server data storage device 212 can be dedicated to a single server cluster, or spread across multiple server clusters.

Cluster data storages 322A, 322B, and 322C of the server clusters 320A, 320B, and 320C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 210 and server data storage device 212 can be distributed across server clusters 320A, 320B, and 320C, various active portions and/or backup/redundant portions of these components can be distributed across cluster data storages 322A, 322B, and 322C. For example, some cluster data storages 322A, 322B, and 322C may be configured to store backup versions of data stored in other cluster data storages 322A, 322B, and 322C.

Cluster routers 324A, 324B, and 324C in server clusters 320A, 320B, and 320C, respectively, may include networking equipment configured to provide internal and external communications for the server clusters. For example, cluster routers 324A in server cluster 320A may include one or more packet-switching and/or routing devices configured to provide (i) network communications between server devices 300A and cluster data storage 322A via cluster network 326A, and/or (ii) network communications between the server cluster 320A and other devices via communication link 328A to network 308. Cluster routers 324B and 324C may include network equipment similar to cluster routers 324A, and cluster routers 324B and 324C may perform networking functions for server clusters 320B and 320C that cluster routers 324A perform for server cluster 320A.

Additionally, the configuration of cluster routers 324A, 324B, and 324C can be based at least in part on the data communication requirements of the server devices and cluster storage arrays, the data communications capabilities of the network equipment in the cluster routers 324A, 324B, and 324C, the latency and throughput of the local cluster networks 326A, 326B, 326C, the latency, throughput, and cost of the wide area network connections 328A, 328B, and 328C, and/or other factors that may contribute to the cost, speed, fault-tolerance, resiliency, efficiency and/or other design goals of the system architecture.

c. Example Client Device

Figure 4:
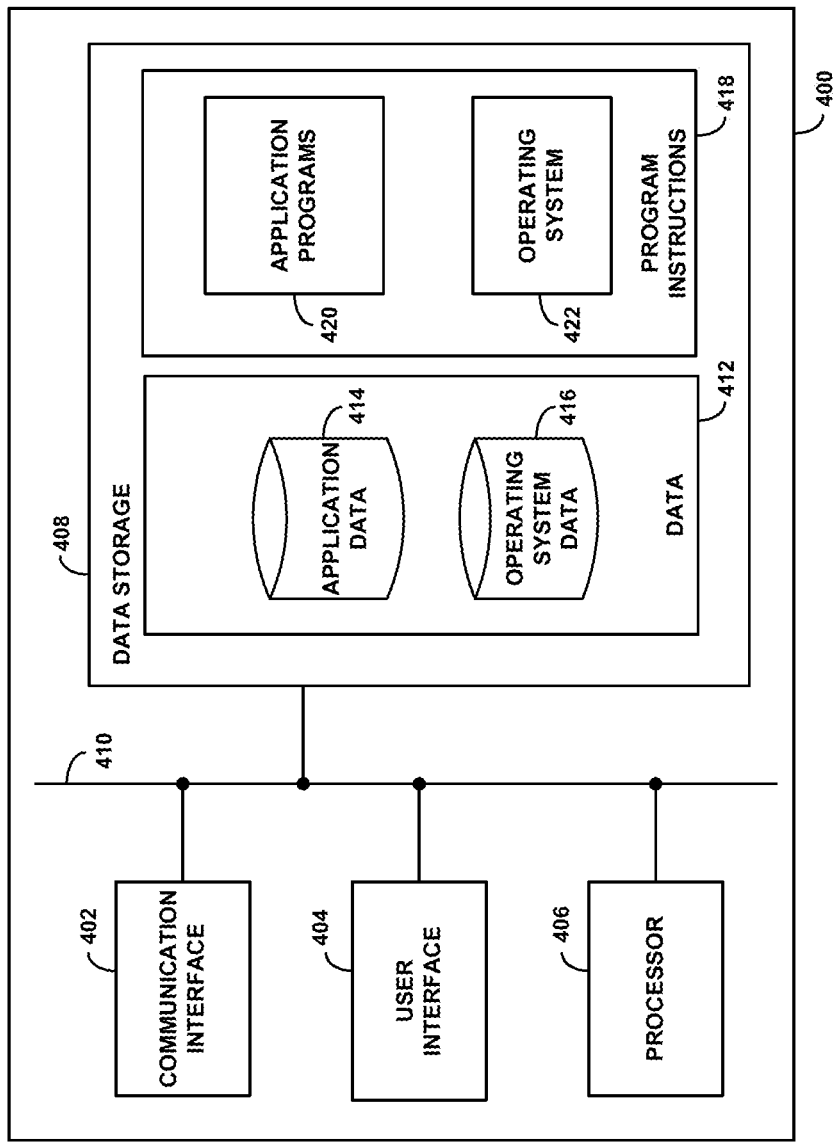
FIG. 4 depicts a block diagram of a client device, in accordance with an example embodiment.

FIG. 4 is a simplified block diagram showing some of the components of an example client device 400. Client device 400 can be configured to perform one or more functions of client devices 202, 204, 206. By way of example and without limitation, client device 400 may be or include a "plain old telephone system" (POTS) telephone, a cellular mobile telephone, a still camera, a video camera, a fax machine, an answering machine, a computer (such as a desktop, notebook, or tablet computer), a personal digital assistant, a wearable computing device, a home automation component, a digital video recorder (DVR), a digital TV, a remote control, or some other type of device equipped with one or more wireless or wired communication interfaces. The client device 400 could also take the form of interactive virtual and/or augmented reality glasses, such as a head-mounted display device, sometimes referred to as a "heads-up" display device. Though not necessarily illustrated in FIG. 4, a head-mounted device may include a display component for displaying images on a display component of the head-mounted device. The head-mounted device may also include one or more eye-facing cameras or other devices configured for tracking eye motion of a wearer of the head-mounted device. The eye-tracking cameras may be used to determine eye-gaze direction and motion of the wearer's eyes in real-time. The eye-gaze direction may be provided as input for various operations, functions, and/or applications, such as tracking the wearer's gaze direction and motion across text displayed in a display device.

As shown in FIG. 4, client device 400 may include a communication interface 402, a user interface 404, a processor 406, and data storage 408, all of which may be communicatively linked together by a system bus, network, or other connection mechanism 410.

Communication interface 402 functions to allow client device 400 to communicate, using analog or digital modulation, with other devices, access networks, and/or transport networks. Thus, communication interface 402 may facilitate circuit-switched and/or packet-switched communication, such as POTS communication and/or IP or other packetized communication. For instance, communication interface 402 may include a chipset and antenna arranged for wireless communication with a radio access network or an access point. Also, communication interface 402 may take the form of a wireline interface, such as an Ethernet, Token Ring, or USB port. Communication interface 402 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH®, interface, and a wide-area wireless interface).

User interface 404 may function to allow client device 400 to interact with a human or non-human user, such as to receive input from a user and to provide output to the user. Thus, user interface 404 may include input components such as a keypad, keyboard, touch-sensitive or presence-sensitive panel, computer mouse, trackball, joystick, microphone, still camera and/or video camera. User interface 404 may also include one or more output components such as a display screen (which, for example, may be combined with a touch-sensitive panel), CRT, LCD, LED, a display using DLP technology, printer, light bulb, and/or other similar devices, now known or later developed. User interface 404 may also be configured to generate audible output(s), via a speaker, speaker jack, audio output port, audio output device, earphones, and/or other similar devices, now known or later developed. In some embodiments, user interface 404 may include software, circuitry, or another form of logic that can transmit data to and/or receive data from external user input/output devices. Additionally or alternatively, client device 400 may support remote access from another device, via communication interface 402 or via another physical interface (not shown). The user interface 404 may be configured to receive user input, the position and motion of which can be indicated by the indicator or cursor described herein. The user interface 404 may additionally or alternatively be configured as a display device to render or display the text segment.

Processor 406 may comprise one or more general purpose processors (e.g., microprocessors) and/or one or more special purpose processors (e.g., DSPs, GPUs, FPUs, network processors, or ASICs). Data storage 408 may include one or more volatile and/or non-volatile storage components, such as magnetic, optical, flash, or organic storage, and may be integrated in whole or in part with processor 406. Data storage 408 may include removable and/or non-removable components.

In general, processor 406 may be capable of executing program instructions 418 (e.g., compiled or non-compiled program logic and/or machine code) stored in data storage 408 to carry out the various functions described herein. Data storage 408 may include a non-transitory computer-readable medium, having stored thereon program instructions that, upon execution by client device 400, cause client device 400 to carry out any of the methods, processes, or functions disclosed in this specification and/or the accompanying drawings. The execution of program instructions 418 by processor 406 may result in processor 406 using data 412.

By way of example, program instructions 418 may include an operating system 422 (e.g., an operating system kernel, device driver(s), and/or other modules) and one or more application programs 420 (e.g., address book, email, web browsing, social networking, and/or gaming applications) installed on client device 400. Similarly, data 412 may include operating system data 416 and application data 414. Operating system data 416 may be accessible primarily to operating system 422, and application data 414 may be accessible primarily to one or more of application programs 420. Application data 414 may be arranged in a file system that is visible to or hidden from a user of client device 400.

Application programs 420 may communicate with operating system 412 through one or more application programming interfaces (APIs). These APIs may facilitate, for instance, application programs 420 reading and/or writing application data 414, transmitting or receiving information via communication interface 402, receiving or displaying information on user interface 404, and so on.

In some vernaculars, application programs 420 may be referred to as "apps" for short. Additionally, application programs 420 may be downloadable to client device 400 through one or more online application stores or application markets. However, application programs can also be installed on client device 400 in other ways, such as via a web browser or through a physical interface (e.g., a USB port) on client device 400.

4. Example System and Operation

Text-to-speech synthesis with user-interface adaptation may be viewed as incorporating manual pacing, by design and as integral to processing, into systems and methods for text-to-speech synthesis. In accordance with example embodiments, speech output may be produced incrementally as a user performs a focusing activity, such as hovering a cursor over words one by one on a desktop computer with a mouse, or tracking text with their finger on a tablet, or engaging in some other form of manual text tracking on a device having an interactive display. As the user does this, their tracking movements may be converted into inputs (e.g., cursor inputs) to a text-to-speech module or subsystem. The text-to-speech module may use the input tracking information to adapt the generation of speech characteristics that drive a speech generator. The result may be synthesized speech of the text spoken out in alignment with the user's tracking of the text. In particular, the TTS module and speech generator may speak out (or otherwise output) the text that the user is pointing to, at the rate at which the user is moving their finger or cursor across the displayed text, and in a natural-sounding manner.

Technical challenges in implementing manually-paced text-to-speech synthesis that delivers a high-quality voice output while respecting the user's position and velocity of tracking the text may be illustrated by considering a somewhat naive approach that simply observes what word a user is currently pointing to, and sends that word to the TTS engine for articulation. While this may seem, in principle, reasonable, the effect is highly sub-optimal, devoid of prosody that makes a synthesized voice life-like. To understand why, consider first an example of nominal TTS operation, carried out without any user interaction for manually-paced control. When a sentence, for example, is sent to a TTS engine for enunciation, a number of linguistic operations are first performed before speech is synthesized. These include grapheme-to-phoneme conversion, which is used to disambiguate words with the same spelling but different pronunciations (such as the present and past tense of the word read). Each phoneme in the sentence is given a time duration (and therefore a rate) and a volume. The overall sense of the sentence is inferred (for example, if it is a question or an exclamation) and a pitch contour is generated.

Figure 5:
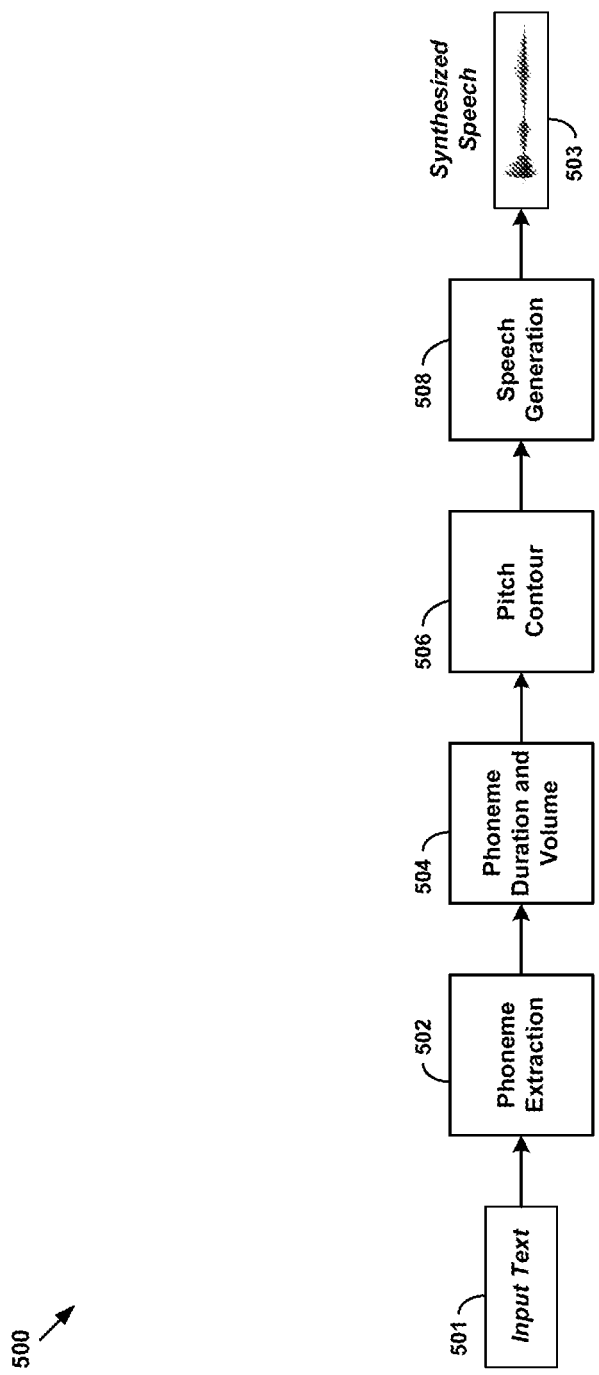
FIG. 5 depicts an example process flow of text-to-speech synthesis, in accordance with an example embodiment.

An example process flow 500 of nominal TTS synthesis is illustrated in FIG. 5. The process flow 500 could be carried out by the TTS system 100 of FIG. 1, for example. As shown, the process flow 500 begins with phoneme extraction 502 of input text 501, which could be performed by the text analysis module 102, for example. The result of phoneme extraction 502 could be the phonetic transcription 103, for example, which could include a given phoneme for synthesis processing, as well as one or more preceding and following phonemes that provide "context" for how the given phoneme should be articulated. As used herein, the terms "preceding," "following," and the like as applied to context refer to reading order. Thus, a preceding phoneme (or other language unit) refers to a phoneme that corresponds to preceding text, read before given text associated with the given phoneme (or other language unit). Similarly, a following phoneme (or other language unit) refers to a phoneme that corresponds to following text, read after given text associated with the given phoneme (or other language unit).

The next operations in the example process flow 500 are operation 504, determination of phoneme duration and volume, and operation 506, determination of pitch contour. These operations could be carried out by the text-to-speech subsystem 104 of FIG. 1, for example. In an example embodiment, phoneme duration and volume, and pitch contour could correspond to, or be considered aspects of, what may be deemed "speech characteristics." In the example of FIG. 1, these may be acoustic characteristics 105, and could include or be represented as data in the form of feature vectors, for example.

As shown, the final operation 508 is speech generation, using the phoneme duration and volume, and pitch contour as input, and producing synthesized speech 503 as output. More generally, speech generation may use speech characteristics (or acoustic characteristics) as input. Again referring to FIG. 1, this operation may be carried out by the speech generator 106.

Referring again to the TTS subsystem 104 in FIG. 1 and the description of operation of the TTS system 110, operations 504 and 506 may be characterized in an example embodiment as determination of a mapping of the extracted phonemes (including context) to speech features that parameterize the spoken rendering of the extracted phonemes. As described above, this may entail using an HMM-based and/or ANN-based model for recognizing speech features associated with phonetic transcriptions of written text. The recognition may be probabilistic, with an achievable confidence level or some other likelihood measure that is dependent on a degree of training, for example.

In such an arrangement, recognition may further involve applying both a speech model and a language model in order to predict the proper articulation of each phoneme. Articulation describes, for example, beginning, middle, and ending intonation, duration, and volume, among other characteristics. That is, articulation can use the determinations made in operations 504 and 506. The phonetic and language contexts for these determinations can be related to the pace at which the text is "read" and processed into speech. In the absence of user interaction to control or adjust the pace, a "canonical" pace of phonetic and language interpretation may be used for generating natural-sounding speech at a canonical pace of speech.

As an example, a canonical pace (or canonical speech-pace) could be the pace that a human might speak with when reading a text passage out loud to a listener or audience. It should be understood, however, that a canonical pace may not correspond to a precise rate of speaking, but rather may generally describe a natural and largely consistent pace that a typical listener would find clear and comprehensible. It could also be considered a sort of initial pace or default pace defined for contrast with an adjustable or manual pace that a user might indicate via interactive tracking of displayed text, as described in accordance with example embodiments herein. The default, or canonical, speech-pace or pace may be predetermined, or can be user defined in some examples.

Figure 6:
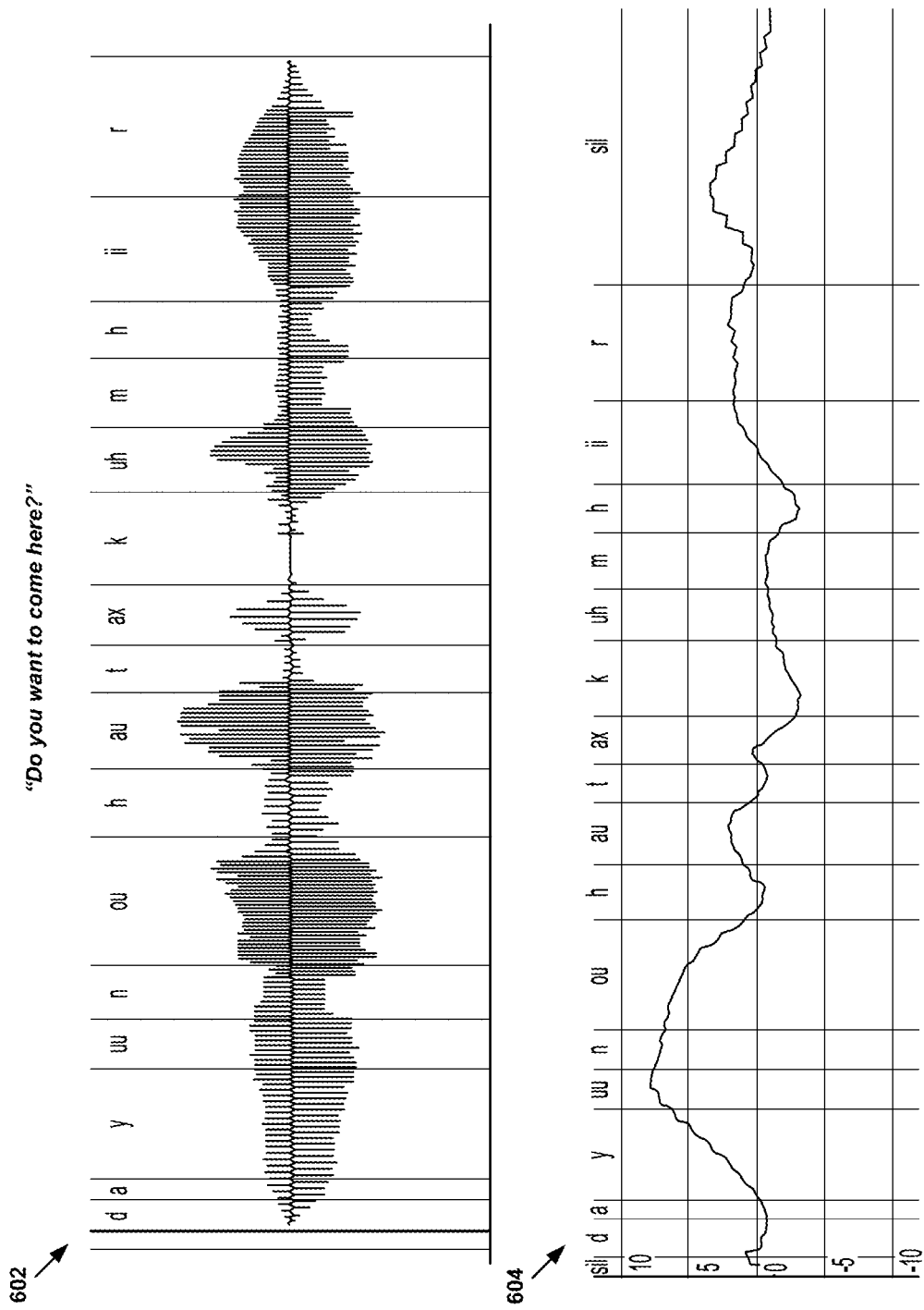
FIG. 6 illustrates an example waveform and pitch profile of speech, in accordance with an example embodiment.

FIG. 6 illustrates an example waveform and pitch profile of speech that could be synthesized according to the example process flow 500, in accordance with an example embodiment. The top panel in FIG. 6 shows a synthesized waveform 602 for the simple sentence "Do you want to come here?" Each phoneme of the sentence is also labeled at the top of the waveform, and the horizontal spacing between vertical lines separating each phoneme represents the duration of each spoken segment. The bottom panel in FIG. 6 shows the corresponding pitch profile 604, with the same phoneme labels and duration spacing overlaid. Note that the pitch profile could correspond to the pitch profile of the synthesized speech specified by the synthesized waveform, or could be generated in the speech synthesis process carried out by the TTS subsystem, for example. In either case, the pitch profile represents one aspect of speech characteristics. Both panels of FIG. 6 illustrate an example of speech that may be synthesized at a canonical (or default) pace.

The problems alluded to above in connection with a simplified or naive approach of synthesizing speech by interactively identifying one word at a time, or even one phoneme at a time, from displayed text, is that the context information may be incorrectly interpreted or possibly lost entirely. The result may be word-by-word, or phoneme-by-phoneme articulation that sounds unnatural or hard to follow, and in any case disconnected from the way a user would articulate the text themselves if they were visually scanning the text at the same or similar adjusted pace of their finger (or cursor) across a text display.

As an example, consider the word "to" in the above simple sentence. As spoken at a canonical pace, it may barely be voiced at all. This is indicated by the relatively short duration of the phoneme /t/ in the waveform and pitch profile. Thus, nominal TTS synthesis modeling may process the word "to" in the context of the sentence and surrounding words and at a canonical pace. The simplified or naive approach may result in a fully voiced articulation of the word "to" that sounds out of place and discontinuous with the surrounding works and phonemes, for example. In this example, the full voicing of "to" may be appropriate to manual pacing determined from user input, but the intonation, volume, and pitch, among other speech characteristics may sound unnatural to a human ear.

In order to overcome problems such as those described above, and to address the challenge of converting user interaction that provides manual pacing of TTS synthesis, the inventor has devised techniques that may incorporate context determined from canonically-paced TTS synthesis as feedback to manually-paced TTS synthesis. By doing so, a TTS system may synthesize speech characteristics and output synthesized speech at a pace that faithfully reflects interactive user control of pacing, while at the same time producing synthesized speech that sounds natural and appropriate to the manually-controlled pace set by the user's interaction.

a. Example Text-to-Speech with User-Interface Adaptation

Figure 7:
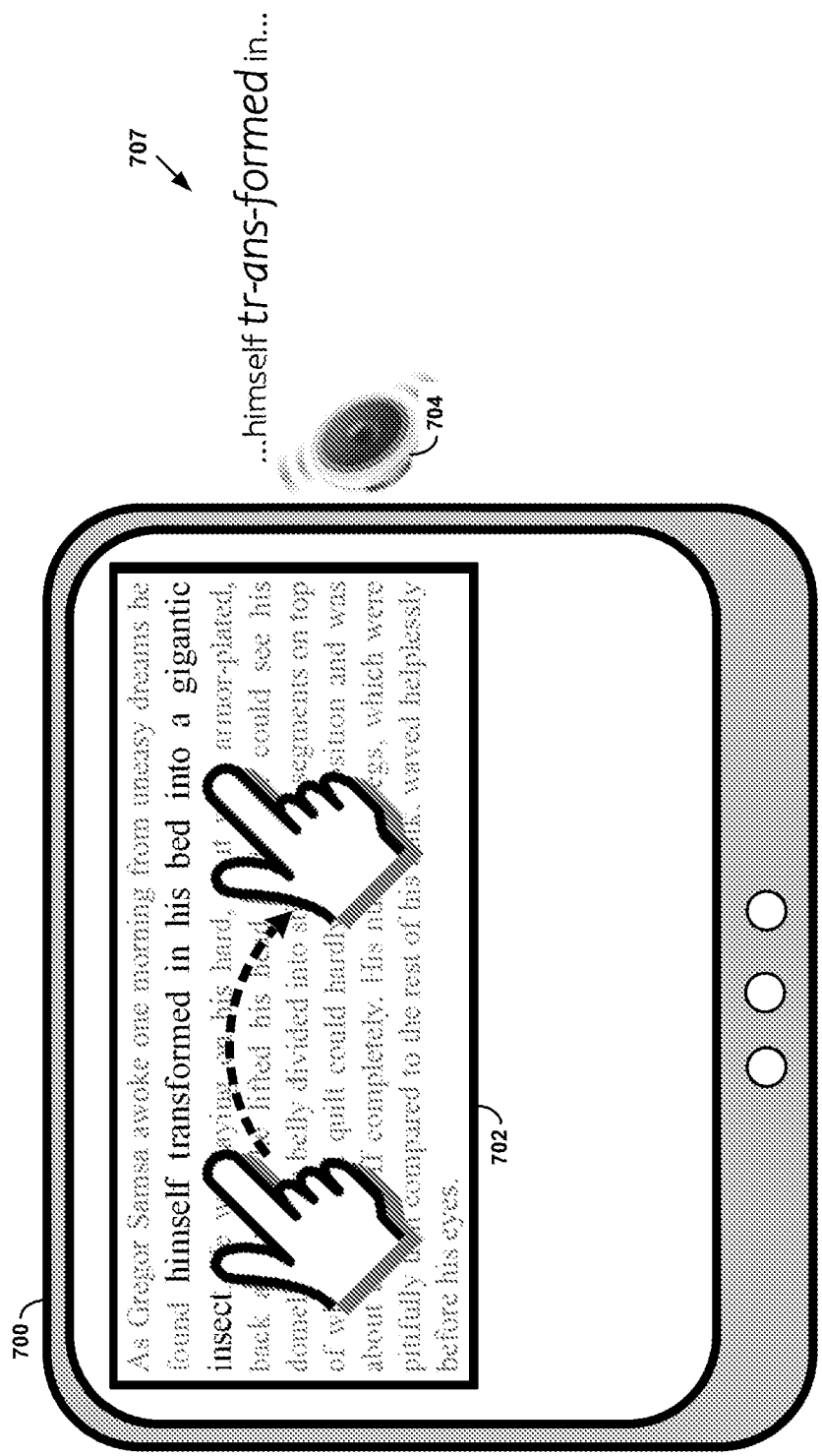
FIG. 7 is a conceptual illustration of an example text-to-speech application with user-interface adaptation, in accordance with an example embodiment.

FIG. 7 is a conceptual illustration of an example text-to-speech application with user-interface adaptation, in accordance with an example embodiment. By way of example, the example TTS application is shown as it might appear on a user device 700 (which can be implemented as user device 400, for example) that has a display screen, such as a laptop or tablet, for example. A visual display 702 of text (a text segment) appears on a portion of the display screen. User interaction is represented by an icon of a pointing finger shown at two successive locations across the displayed text. A curved dotted arrow between the two locations indicates user tracking across a portion of the text. As a visual cue, most of the text is shown grayed out, with only a sentence portion currently undergoing speech synthesis shown in black in an enlarged font. However, in an example embodiment, the graying out, or other visual defocusing effect, could be an explicit characteristic of an actual display. This could be done as a real-time visual aid to a user, to help the user focus on the text being tracked while deemphasizing surrounding text that might otherwise become a visual distraction. In other words, the identified text (or text of the identified portion) can be presented or displayed with visual clarity and focus as compared to the rest of the text—this may comprise actively emphasizing the identified text and/or actively minimising the rest of the text by displaying the text of the text segment, other than the text of the identified portion, with visual defocusing. The defocusing could be graying out, is in the illustrated example, or a blurring of text. Other possible defocusing effects could be used as well. Such visual "defocusing" and "focusing" may be beneficial, since displaying the text portion identified by the user more prominently can assist the user in keeping the identified text segment in their visual focus or visual field of attention.

The motion of the cursor can be used to adapt the canonical pace of speech synthesis. For example, the motion of the indicator or cursor indicated by the cursor input corresponds to real-time tracking of text in the identified portion by the user. In accordance with example embodiments, the speed (velocity) and/or acceleration of the user's tracking motion may determine the pace of synthesis processing and speech articulation. For example, a first speed and/or acceleration may translate to a first pace that is above a first threshold pace but below a canonical pace, where the canonical pace is a second threshold pace. In detecting the first pace, the example system might synthesize and articulate speech at a word-by-word pace (i.e., a pace at which individual words are synthesized by the TTS system); a tracking rate of word-by-word corresponds to a tracking rate above the first (predetermined) threshold and below the second (predetermined) threshold corresponding to the default or canonical pace. As another example, a second speed and/or acceleration may translate to a second pace that is at or below the first threshold, in which case the example system might synthesize and articulate speed at a phoneme-by-phoneme pace (i.e., a pace at which individual phonemes are synthesized by the TTS system); a tracking rate of phoneme-by-phoneme corresponds to a tracking rate at or below the first threshold. Other arrangements of translating speed and/or acceleration of user tracking into synthesis and articulation pacing are possible as well, including a user interface or application "dashboard" for setting a desired pace.

For purposes of illustration, and byway of example, the user tracking in FIG. 7 may be taken to be slow enough (e.g., below a first threshold pace) to signal to the synthesis application to generate and output synthesized speech 707 at a phoneme-by-phoneme pace. The synthesized speech may thus be emitted from a speaker component 704 of the user device 700. Also for purposes of illustration, the speaker 704 is explicitly shown as a visual cue that it is a component of the user device. In an actual user device, the speaker component would likely be physically internal and not visible.

In this example, the phoneme-by-phoneme rendering of the synthesized speech 707 is signified by the hyphenation of the word "tr-ans-formed" and the enlarged font. In accordance with example embodiments, a manually-paced TTS system, such as one conceptually illustrated in FIG. 7, may render the articulation of "tr-ans-formed" in a natural-sounding manner, as if the user were slowly sounding out the word "transformed," for example. This capability, and more generally the capability of adapted-pace TTS synthesis articulated naturally, may be achieved by modifying nominal speech synthesis processing, as now described by way of example. In an example embodiment, phoneme-by-phoneme paced synthesis of a word or phrase may be followed by an automatic re-reading of the word or phrase at a canonical pace. As can be seen further in FIG. 7, the word "himself" is output at a faster pace than the articulation of "transformed"; the approach described herein facilitates a smooth transition between the two different paces, which can improve the human auditory perception of the user. By improving user perception, computational resources may also be reduced, since the user may not need to repeat the TTS request and subsequent interactions with the client device may be reduced.

In accordance with example embodiments, canonically-paced TTS synthesis of text may provide "prior-synthesized speech" that may serve as input and/or feedback to speech synthesis of text that is being tracked by cursor input, or the like, while being displayed in an interactive display device. The prior synthesis may be carried out during a time interval entirely prior to the TTS synthesis being paced according to the tracking (e.g., seconds, minutes, or even more, prior), or during an interval that is substantially concurrent with the TTS synthesis being paced according to the tracking the TTS synthesis being paced according to the tracking. In the latter case, the prior synthesis could be carried out one or a few steps ahead of the adapted-pace synthesis, for example; e.g., with sufficient lead time to serve as feedback.

The processing flow of adapted-pace, or manually-paced, TTS may be described in terms of modifications of the example nominal synthesis processing in at least two ways. First, it retains a context of previously generated speech (e.g., prior to the current word or phoneme), so that it is able to iteratively produce speech without each synthesized sample appearing to come from a new synthesis instance. In other words, it passes the context of previously spoken text to the synthesizer so that the synthesizer generates a "continuation" of the speech signal rather than a new one. Second, it adapts the volume, rate, and pitch contours of the generated speech, so that the rate or pace indicated by tracking is respected.

Figure 8:
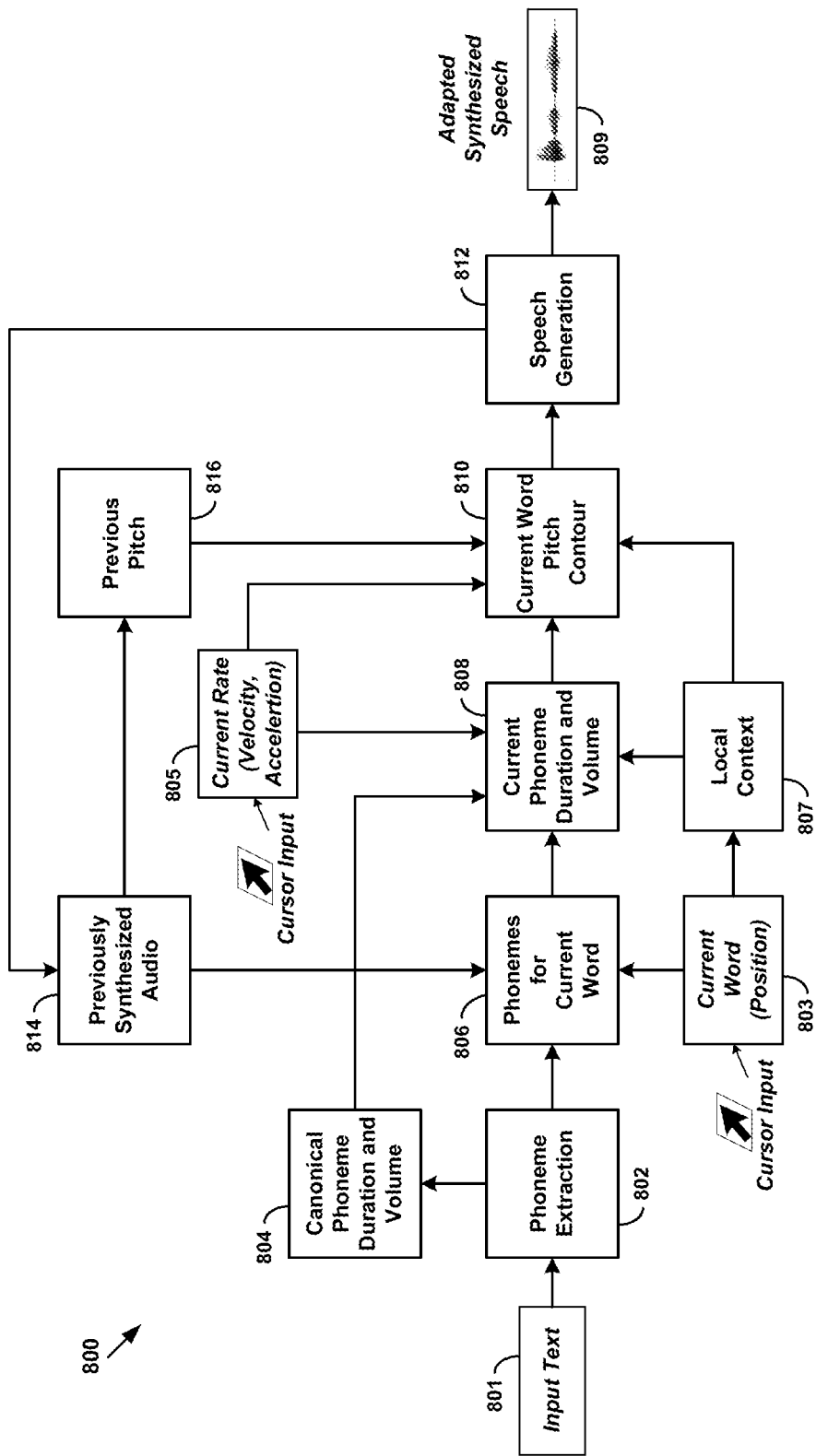
FIG. 8 depicts an example process flow of text-to-speech synthesis with user-interface adaptation, in accordance with an example embodiment.

FIG. 8 depicts an example process flow 800 of text-to-speech synthesis with user-interface adaptation, in accordance with an example embodiment. As with the example nominal process flow of FIG. 5, the process flow 800 could be carried out by the TTS system 100 of FIG. 1, for example. As shown, the process flow 800 begins with phoneme extraction 802 of input text 801. In process flow 800, phoneme extraction corresponds to grapheme-to-phoneme conversion for the entire passage, using the whole text, referred to hereinafter to as global context. The global context may be used to disambiguate pronunciations and infer canonical phoneme durations, volumes, and pitch contours. That is, the global context includes the whole text and the elements that make up the TTS of the whole text as though user tracking were not present—i.e., canonical processing. From this point, the process flow 800 may be considered as following two roughly parallel "pipes" of processing. The first corresponds generally to canonical processing, which generates the prior synthesis mentioned above. The second corresponds to the manually-paced or adapted synthesis processing, which uses aspects of the prior synthesis for context.

For the prior-synthesis (canonical) processing pipe, the extracted phonemes are input to operation 804, for determination of canonical phoneme duration and volume. This is followed by operation 808, for determination of current phoneme duration and volume according to canonical processing. Next, the operation 810 determines current word pitch contour, again at canonical pacing. This is followed by speech generation 812. However, the canonical speech is not output audibly. Rather, it is provided in operation 814 as previously synthesized audio, which is used in the adaption processing that is carried out according to the manually-paced synthesis pipe, as now described.

For the manually-paced or adapted synthesis processing pipe, user tracking input is used to determine a current word 803 and a current rate 805. The current word 803 may correspond to a current tracking position within the displayed text, while the current rate 805 may correspond first and second time derivatives of the tracking position (i.e., velocity and acceleration of the tracking position). By way of example in FIG. 8, these inputs may correspond to cursor input, as indicated. However, as discussed above, position and motion (e.g., velocity and acceleration) input may more generally be position and motion of any suitable tracking operation, non-limiting examples of which have been described also above. It should be understood, therefore, that reference herein to "cursor input" in the context of manually-paced or adapted TTS synthesis may be taken to apply to any one or more of the non-limiting tracking operation examples provided or the like.

The tracking position may then be used to index the current word within the globally extracted phonemes determined in phoneme extraction 802. This gives the synthesizer the subset of phonemes which are to be spoken out at this moment, indicated as phonemes for current word 806. At the same time, the previously synthesized audio 814 provides input to the phonemes for the phonemes for current word 806, which are then processed to determine current phoneme duration and volume 808.

The current word 803 is also used to determine local context 807, which is input to both the current phoneme duration and volume 808 and to the current word pitch contour 810. The current phoneme duration and volume 808 also receives as input the canonical phoneme duration and volume 804 and the current rate 805. These three inputs, local context 807, canonical phoneme duration, and volume 804 and the current rate 805, are used to determine the current phoneme duration and volume 808 with a duration corresponding to the current rate, and with a phoneme volume consistent with the canonical phoneme volume.

The next operation 810 determines current word pitch. This operation also receives as input the local context 807, the current rate 805, and the previous (prior synthesized) pitch 816, which is derived from the previously synthesized audio 814, as indicated. These three inputs, local context 807, the current rate 805, and the previous pitch 816, are used to determine the current word pitch 810 to be continuous and/or consistent with the prior-synthesized pitch. For example, the pitch and prosody of the synthesized speech of the text of the identified portion can be continuous with the pitch and prosody of the synthesized speech of the text of the context portion both immediately before and immediately following the identified portion. This smooth transition can reduce dissonance and improve human auditory perception for the user. By improving user perception, computational resources may also be reduced, since the user may not need to repeat the TTS request.

The local context 807 is used to help ensure prosodic consistency. For example, the possible start-and-stop and/or discontinuous nature of speech output resulting from manual pacing may lead to differences in how the text as a whole is comprehended by the user. For instance, certain words that would otherwise be skipped, joined, or only very briefly spoken—such as the word "to" in the sentence "I want to go home"—may have to be fully enunciated when the user explicitly tracks them. However, such words should still be given pitch, duration, and volume values that are relative to the prosodic importance of the words within their immediate neighborhood. Linguistic information from the global context, in the immediate vicinity of the current word, is used to derive the local context. For example, local context 807 can be based on a context portion of text surrounding the identified portion of text; the context portion of text can be one or more phonemes, one or more words, or one or more sentences, as appropriate. The context portion includes text immediately before and immediately following the identified portion (i.e. at least one phoneme of the text segment adjacent either end of the identified portion, optionally at least one language unit).

The current phoneme duration and volume 808 and current word pitch 810 are then processed by the speech generator to produce the adapted synthesized speech 809. This is synthesized speech articulated at a pace corresponding to the user tracking of the text, and with a natural-sounding pitch and other speech characteristics.

The example process flow 800 of text-to-speech synthesis with user-interface adaptation may be summarized as shown in Table 1. The entire process flow 800 and/or the summary in Table 1 may be repeated until an entire audio rendering of a text passage or other text portion is completely spoken. As discussed above, reference to "cursor input" is by way of example. Various other forms of tracking input, including example described above, may be used in the process flow summarized in Table 1.

1. The TTS engine performs grapheme-to-phoneme conversion for the entire passage, using the whole text to generate a global context.
 2. Cursor input provides the current word, and the current rate in the form of tracking position velocity and/or acceleration tracking position
 3. The tracking position is used to index the current word within the globally extracted phonemes. This gives the synthesizer the subset of phonemes which are to be spoken out at this moment.
 4. The previously spoken segment is tracked by the system to provide prior synthesized audio and previous pitch derived from the prior synthesized audio. This information is used to ensure that the audio for this segment feels continuous relative to the audio for the previous segment.
 5. Linguistic information from the global context, in the immediate vicinity of the current word, is used to derive a local context. This immediate linguistic and prosodic neighborhood is the local context.
 6. The local context, previous audio, and current position within the global context are used together with the rate specified by the user, to adjust the pitch, rate and duration of the current word's phonemes, to generate the segment of audio that will be spoken next.

Table 1

The example process flow 800 may be considered as describing word tracking, such as word-by-word reading. For phoneme-by-phoneme tracking the process flow may be similar, but with word-based local context now being augmented with phoneme-based (sub-word-based) local context also. In this case, when a user tracks the text, the system may track which syllable or phoneme they are pointing to, and may thus generate that particular unit of reading.

Note that generating a particular phoneme may not be appropriate in all circumstances, even if the user is in phoneme mode. Thus, above a certain velocity of tracking the text, the system may fall back to word mode, reserving phoneme mode only when the user is deliberately trying to sound out words phonemically (as determined by their velocity and acceleration pattern).

Example embodiments of text-to-speech application with user-interface adaptation advantageously link tracking and reading in a manner that may substantially increase a user's attention to the text. The nature of vision is such that the user's visual field can contribute a significant amount of stimulus to the brain. Keeping a tracking operation indicator (such as a mouse-controlled pointer/cursor, a finger tracking on a touch-screen, or measured/monitored eye-gaze direction mapped to text display, for example) pointed over the next word to read can ensure that the majority of the stimulus comes from the user's text, rather than distractions in the user's environment.

This focus can be further enhanced by deliberately defocusing, desaturating or blurring parts of the text that are far away from the user's cursor, so that visually distracting areas of the screen are now reduced in stimulus until the user's cursor reaches those areas. This may further enhance the experience of concentration that a user would have when manually pacing TTS. Various defocusing techniques and/or operations may be used, besides blurring or fading, for example. Non-limiting examples of visual defocusing may include such visual effects as fading or blurring or displaying with a different background or foreground color compared with text outside of the user's cursor (or other interactive focusing/tracking). Other defocusing operations may include changing the font or font size of defocused text (e.g., shrinking font size relative to the text outside of the user's interactive focusing/tracking, and/or displaying the defocused text in a relatively less authoritative font style than the text outside of the user's interactive focusing/tracking). In addition, text within the user's interactive focusing/tracking could be displayed within a text box or underlined, while the defocused text is excluded from the text box or displayed without underlining. Other defocusing effects are possible as well.

One general challenge related to reading words through manually tracking phonemes or words is that while this focuses concentration, it may also place a greater demand on the working memory of the learner. For example, since the pace of reading can be slower, the user may have to retain words from earlier in time in their memory in order to successfully decode the sentence.

Example embodiments described herein address this challenge by modeling user-paced TTS synthesis on the visual process of saccading, by which the eye reads text. When reading fluently, the eye typically does not move character to character, or even word to word. Rather, it jumps from one group of words to another, taking in multiple words at a time. For example, when reading text that is arranged in narrow columns, the eye may simply move down through the rows, taking in an entire column in a single glance. The eye is then able to move back and forth to re-read if necessary.

Thus, example embodiments described herein may be viewed as implementing a sort of "audio saccading" that functions in a complementary manner to the manual tracking described above. That is, the input text is broken into words and phonemes for TTS, and dependency parsing and other linguistic labeling approaches are used to identify larger groups of related words. For example, TTS techniques may be used to split the input text into noun phrases, clauses, and sentences. These various representations may then be arranged hierarchically, with the text consisting of sentences, consisting of sentence fragments, consisting of clauses, consisting of phrases, consisting of word collocations, consisting of words.

The linguistically aware re-reading made possible by example embodiments described here may thus speak out the hierarchically higher level of representation when the user initiates a saccade-analogous user interaction. This interaction may also be implicitly initiated by the system when units at a certain level of representation are completed. For example, the system may be configured to re-read words after phonemes are sounded out. When the user manually sounds out the phonemes of a word, the phonemes are spoken out, and then the complete word may be spoken out, at a normal (e.g., canonical) pace, by the system. In another embodiment, the system may be configured to re-read sentences after individual words are sounded out. In this case, the user may control the pace of reading out individual words, but as soon as a whole sentence has been tracked, the sentence may be spoken out.

This audio saccade analogy may also be initiated manually, for example, through a special gesture, key, or other application dashboard control. Thus, a user who may have lost track of the sentence when reading out the individual words can initiate re-reading of the entire sentence (or the phrase which the words were a part of). This re-reading may help boost comprehension while assisting the user's working memory by only reading words that are relevant to the current context that the user is in.

In this manner, by merging intelligent TTS and linguistically-aware re-reading, reading comprehension may be greatly enhanced, and text and audio representations may work together to improve a user's engagement and retention from the text.

b. Example Method

In example embodiments, an example method can be implemented as machine-readable instructions that when executed by one or more processors of a system cause the system to carry out the various functions, operations and tasks described herein. In addition to the one or more processors, the system may also include one or more forms of memory for storing the machine-readable instructions of the example method (and possibly other data), as well as one or more input devices/interfaces, one or more output devices/interfaces, among other possible components. Some or all aspects of the example method may be implemented in a TTS synthesis system, which can include functionality and capabilities specific to TTS synthesis. However, not all aspects of an example method necessarily depend on implementation in a TTS synthesis system.

In example embodiments, a TTS synthesis system may include one or more processors, one or more forms of memory, one or more input devices/interfaces, one or more output devices/interfaces, and machine-readable instructions that when executed by the one or more processors cause the TTS synthesis system to carry out the various functions and tasks described herein. The TTS synthesis system may also include implementations based on one or more hidden Markov models. In particular, the TTS synthesis system may employ methods that incorporate HMM-based speech synthesis, as well as other possible components. Additionally or alternatively, the TTS synthesis system may also include implementations based on one or more artificial neural networks (ANNs). In particular, the TTS synthesis system may employ methods that incorporate ANN-based speech synthesis, as well as other possible components.

Figure 9:
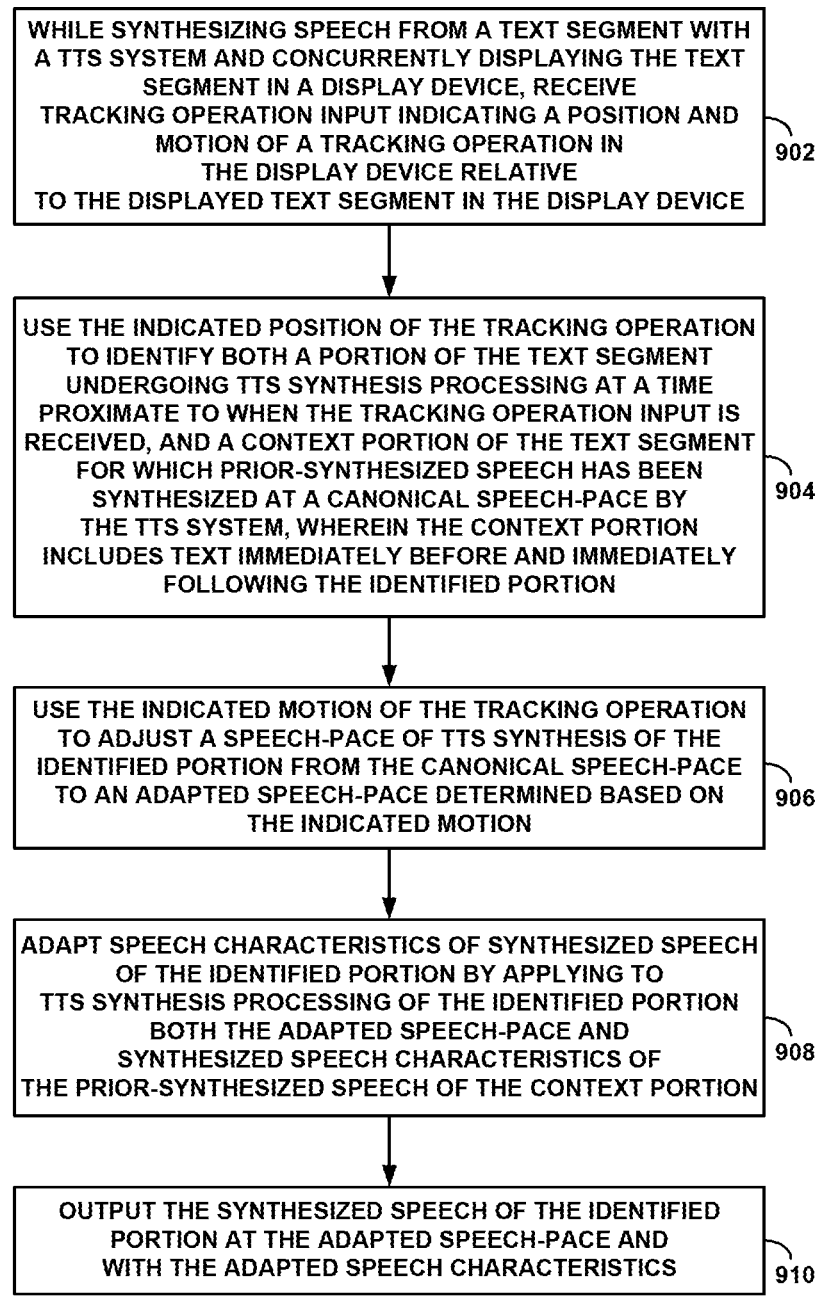
FIG. 9 is a flowchart illustrating an example method in accordance with an example embodiment.

FIG. 9 is a flowchart illustrating an example method in accordance with example embodiments. At step 902, a text-to-speech (TTS) system that is synthesizing speech from a text segment with a text-to-speech (TTS) system and concurrently displaying the text segment in a display device, may receive input indicating a position and motion of a tracking operation relative to the displayed text segment in the display device. In implementations where the TTS system is implemented on a server remote from the display device, step 902 can comprise, while synthesizing, with a text-to-speech (TTS) system, speech from a text segment displayed on a display device, receiving input indicating a position and motion of a tracking operation at the display device displaying the text segment.

At step 904, the TTS system may use the indicated position of the tracking operation to identify a portion of the text segment undergoing TTS synthesis processing. The portion may be identified as the portion of the text being processed at a time proximate to when the tracking operation input (or input indicating the position and motion of the tracking operation) is received, or the portion may be identified as the portion of the text segment located proximate to the indicated position of the tracking operation. At step 904 the TTS system may also use the indicated position of the tracking operation to identify a context portion of the text segment for which prior-synthesized speech has been synthesized at a canonical speech-pace by the TTS system. The context portion may include text immediately before and immediately following the identified portion.

At step 906, the TTS system may use the indicated motion of the tracking operation to adjust a speech-pace of TTS synthesis of the identified portion from the canonical speech-pace to an adapted speech-pace determined based on the indicated motion.

At step 908, the TTS system may adapt speech characteristics of synthesized speech of the identified portion by applying to TTS synthesis processing of the identified portion both the adapted speech-pace and synthesized speech characteristics of the prior-synthesized speech of the context portion.

Finally, at step 910, the TTS system may output the synthesized speech of the identified portion at the adapted speech-pace and with the adapted speech characteristics. The synthesized speech can be rendered or played locally, or output by the TTS system to a remote device.

In accordance with example embodiments, the example method may further include synthesizing the prior-synthesized speech of the context portion during a time interval concurrent with synthesizing speech of the portion. In this case, applying both the adapted speech-pace and the synthesized speech characteristics of the prior-synthesized speech of the context portion may entail applying both the adapted speech-pace and the synthesized speech characteristics of the prior-synthesized speech of the context portion as feedback to TTS synthesis processing of the identified portion.

In accordance with example embodiments, the example method may further include synthesizing the prior-synthesized speech of the context portion during a time interval prior to synthesizing speech of the portion.

In accordance with example embodiments, receiving the tracking operation input may entail receiving input of a virtual pointing indicator input (or cursor input) via a user interface communicatively connected, or part of, the display device. Further, receiving the tracking operation input indicating the position and motion of the virtual pointing indicator in the display device relative to the displayed text segment in the display device may entail receiving, in real-time, tracking of position, velocity, and acceleration of the virtual pointing indicator relative to the displayed text segment. In further accordance with example embodiments, the virtual pointing indicator may be any one or more of a (graphically) rendered cursor, a haptic input of position and motion on a touch-screen, or an input of eye-tracking position and motion of a user projected on a display screen. The virtual pointing indicator may or may not be graphically rendered, as appropriate.

In accordance with example embodiments, using the indicated position of the tracking operation to identify the portion of the text segment undergoing TTS synthesis processing may involve using the position of the tracking operation to identify a language unit in the identified portion that is undergoing TTS synthesis processing. Further, the language unit may be one or more of a phoneme, a word, or a phrase corresponding to the text in the identified portion that is undergoing TTS synthesis processing.

In accordance with example embodiments, the indicated motion of the tracking operation may correspond to real-time tracking of text in the identified portion at a tracking rate of word-by-word or phoneme-by-phoneme. As such, applying the adapted speech-pace to TTS synthesis processing of the identified portion may entail synthesizing speech spoken word-by-word if the tracking rate is word-by-word. Similarly, applying the adapted speech-pace to TTS synthesis processing of the identified portion may entail synthesizing speech spoken phoneme-by-phoneme if the tracking rate is phoneme-by-phoneme.

In accordance with example embodiments, the speech characteristics of the synthesized speech of the identified portion may include pitch and prosody of the synthesized speech of the identified portion. Similarly, the speech characteristics of the prior-synthesized speech of the context portion comprise pitch and prosody of the prior-synthesized speech of the context portion. As such, applying to the TTS synthesis processing of the identified portion both the adapted speech-pace and synthesized speech characteristics of the prior-synthesized speech of the context portion may involve generating synthesized speech of the identified portion that is spoken at the adapted speech-pace, and with the pitch and prosody of the synthesized speech of the text of the identified portion continuous with the pitch and prosody of the synthesized speech of the text of the context portion both immediately before and immediately following the identified portion. This continuous pitch and prosody can ensure a smooth transition during speech synthesis, which can reduce dissonance for the user.

In accordance with example embodiments, the indicated motion of the tracking operation may correspond to real-time tracking of text in the identified portion at a tracking rate. As such generating the synthesized speech of the identified portion that is spoken at the adapted speech-pace, and with the pitch and prosody of the synthesized speech of the text of the identified portion continuous with the pitch and prosody of the synthesized speech of the text of the context portion both immediately before and immediately following the identified portion may involve synthesizing speech of the identified portion that is spoken one language unit at a time. In particular, each given spoken language unit of the identified portion may further be spoken with pitch and prosody continuous with the pitch and prosody of synthesized speech of language units of the context portion that are both immediately before and immediately following the given spoken language unit of the identified portion. Further, each language unit may be a phoneme if the tracking rate is no greater than a first threshold rate, or a word if the tracking rate is greater than the first threshold rate and below a second threshold rate.

In accordance with example embodiments, the example method may further include immediately following outputting the synthesized speech of the identified portion at the adapted speech-pace and with the adapted speech characteristics, repeating output of the synthesized speech of the identified portion at the canonical speech-pace and with canonical speech characteristics. By associating the repeated output with the synthesized speech at the adapted speech-rate and with the adapted speech characteristics, this operation may help improve and/or enhance user comprehension and/or literacy.

In accordance with example embodiments, concurrently displaying the text segment in the display device may entail displaying the text of the identified portion with visual clarity and focus; and displaying the text of the text segment, other than the text of the identified portion, with visual defocusing. Non-limiting examples of visual defocusing may include such visual effects as fading or blurring or displaying with a different background or foreground color. Other defocusing operations may include changing the font or font size of defocused text (e.g., shrinking font size relative to the text of the identified portion, and/or displaying the defocused text in a relatively less authoritative font style than the identified portion). In addition, the identified portion could be displayed within a text box or underlined, while the defocused text is excluded from the text box or displayed without underlining. Other defocusing effects are possible as well.

It will be appreciated that the steps shown in FIG. 9 are meant to illustrate a method in accordance with example embodiments. As such, various steps could be altered or modified, the ordering of certain steps could be changed, and additional steps could be added, while still achieving the overall desired operation. The method can be performed by a client device, or by a server, or by a combination of a client device and a server. The method can be performed by any suitable computing device(s).

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. A method comprising:
  while synthesizing speech from a text segment with a text-to-speech (TTS) system and concurrently displaying the text segment in a display device, receiving input indicating a position and motion of a tracking operation relative to the displayed text segment in the display device;
  using the indicated position of the tracking operation to identify both a portion of the text segment undergoing TTS synthesis processing at a time proximate to when the tracking operation input is received, and a context portion of the text segment for which prior-synthesized speech has been synthesized at a canonical speech-pace by the TTS system, wherein the context portion includes text immediately before and immediately following the identified portion;
  using the indicated motion of the tracking operation to adjust a speech-pace of TTS synthesis of the identified portion from the canonical speech-pace to an adapted speech-pace determined based on the indicated motion;
  adapting speech characteristics of synthesized speech of the identified portion by applying to TTS synthesis processing of the identified portion both the adapted speech-pace and synthesized speech characteristics of the prior-synthesized speech of the context portion;
  outputting the synthesized speech of the identified portion at the adapted speech-pace and with the adapted speech characteristics; and
  following outputting the synthesized speech of the identified portion at the adapted speech-pace and with the adapted speech characteristics, repeating output of the synthesized speech of the identified portion at the canonical speech-pace and with canonical speech characteristics in order to associate the repeated output with the synthesized speech at the adapted speech-rate and with the adapted speech characteristics.

2. The method of claim 1, wherein applying to TTS synthesis processing of the identified portion both the adapted speech-pace and the synthesized speech characteristics of the prior-synthesized speech of the context portion comprises applying both the adapted speech-pace and the synthesized speech characteristics of the prior-synthesized speech of the context portion as feedback to TTS synthesis processing of the identified portion.

3. The method of claim 1, further comprising:
  synthesizing the prior-synthesized speech of the context portion during a time interval prior to synthesizing speech of the portion.

4. The method of claim 1, wherein receiving the tracking operation input comprises receiving input of a virtual pointing indicator via a user interface communicatively connected to, or part of, the display device, wherein the virtual pointing indicator being at least one of: a rendered cursor, haptic input of position and motion on a touch-screen, or input of eye-tracking position and motion of a user projected on a display screen.

5. The method of claim 1, wherein receiving the input indicating the position and motion of the tracking operation in the display device relative to the displayed text segment in the display device comprises receiving, in real-time, tracking of position, velocity, and acceleration of the tracking operation relative to the displayed text segment.

6. The method of claim 1, wherein using the indicated position of the tracking operation to identify the portion of the text segment undergoing TTS synthesis processing comprises:
  using the position of the tracking operation to identify a language unit in the identified portion that is undergoing TTS synthesis processing,
  wherein the language unit is at least one of: a phoneme, a word, a phrase, or a sentence corresponding to the text in the identified portion that is undergoing TTS synthesis processing.

7. The method of claim 1, wherein the indicated motion of the tracking operation corresponds to real-time tracking of text in the identified portion at a tracking rate of word-by-word or phoneme-by-phoneme,
  and wherein the applying the adapted speech-pace to TTS synthesis processing of the identified portion comprises:
  synthesizing speech spoken word-by-word if the tracking rate is word-by-word; and
  synthesizing speech spoken phoneme-by-phoneme if the tracking rate is phoneme-by-phoneme.

8. The method of claim 1, wherein the speech characteristics of the synthesized speech of the identified portion comprise pitch and prosody of the synthesized speech of the identified portion,
  wherein the speech characteristics of the prior-synthesized speech of the context portion comprise pitch and prosody of the prior-synthesized speech of the context portion,
  and wherein applying to the TTS synthesis processing of the identified portion both the adapted speech-pace and synthesized speech characteristics of the prior-synthesized speech of the context portion comprises:
  generating synthesized speech of the identified portion that is spoken at the adapted speech-pace, and with the pitch and prosody of the synthesized speech of the text of the identified portion continuous with the pitch and prosody of the synthesized speech of the text of the context portion both immediately before and immediately following the identified portion.

9. The method of claim 8, wherein the indicated motion of the tracking operation corresponds to real-time tracking of text in the identified portion at a tracking rate,
  and wherein generating the synthesized speech of the identified portion that is spoken at the adapted speech-pace, and with the pitch and prosody of the synthesized speech of the text of the identified portion continuous with the pitch and prosody of the synthesized speech of the text of the context portion both immediately before and immediately following the identified portion comprises:
  synthesizing speech of the identified portion that is spoken one language unit at a time, wherein each given spoken language unit of the identified portion is further spoken with pitch and prosody continuous with the pitch and prosody of synthesized speech of language units of the context portion that are both immediately before and immediately following the given spoken language unit of the identified portion,
  wherein each language unit is: a phoneme if the tracking rate is no greater than a first threshold rate, or a word if the tracking rate is greater than the first threshold rate and below a second threshold rate.

10. The method of claim 1, wherein concurrently displaying the text segment in the display device comprises:
- displaying the text of the identified portion with visual clarity and focus; and
- displaying the text of the text segment, other than the text of the identified portion, with visual defocusing, wherein visual defocusing comprises visual effects, the visual effects being at least one of fading, blurring, displaying with a different background or foreground color, changing font and/or font size, or excluding defocused text from a text box drawn around the identified portion.

11. A system including a text-to-speech (TTS) system comprising:
- one or more processors;
- memory; and
- machine-readable instructions stored in the memory, that upon execution by the one or more processors cause the system to carry out operations including:
  - while synthesizing speech from a text segment with the TTS system and concurrently displaying the text segment in a display device, receiving input indicating a position and motion of a tracking operation relative to the displayed text segment in the display device;
  - using the indicated position of the tracking operation to identify both a portion of the text segment undergoing TTS synthesis processing at a time proximate to when the tracking operation input is received, and a context portion of the text segment for which prior-synthesized speech has been synthesized at a canonical speech-pace by the TTS system, wherein the context portion includes text immediately before and immediately following the identified portion;
  - using the indicated motion of the tracking operation to adjust a speech-pace of TTS synthesis of the identified portion from the canonical speech-pace to an adapted speech-pace determined based on the indicated motion;
  - adapting speech characteristics of synthesized speech of the identified portion by applying to TTS synthesis processing of the identified portion both the adapted speech-pace and synthesized speech characteristics of the prior-synthesized speech of the context portion;
  - outputting the synthesized speech of the identified portion at the adapted speech-pace and with the adapted speech characteristics; and
  - following outputting the synthesized speech of the identified portion at the adapted speech-pace and with the adapted speech characteristics, repeating output of the synthesized speech of the identified portion at the canonical speech-pace and with canonical speech characteristics in order to associate the repeated output with the synthesized speech at the adapted speech-rate and with the adapted speech characteristics.

12. The system of claim 11, wherein applying to TTS synthesis processing of the identified portion both the adapted speech-pace and the synthesized speech characteristics of the prior-synthesized speech of the context portion comprises applying both the adapted speech-pace and the synthesized speech characteristics of the prior-synthesized speech of the context portion as feedback to TTS synthesis processing of the identified portion.

13. The system of claim 11, wherein the operations further include:
- synthesizing the prior-synthesized speech of the context portion during a time interval prior to synthesizing speech of the portion.

14. The system of claim 11, wherein receiving the input indicating the position and motion of the tracking operation in the display device relative to the displayed text segment in the display device comprises receiving, in real-time, tracking of position, velocity, and acceleration of the tracking operation relative to the displayed text segment.

15. The system of claim 11, wherein the speech characteristics of the synthesized speech of the identified portion comprise pitch and prosody of the synthesized speech of the identified portion,
- wherein the speech characteristics of the prior-synthesized speech of the context portion comprise pitch and prosody of the prior-synthesized speech of the context portion,
- and wherein applying to the TTS synthesis processing of the identified portion both the adapted speech-pace and synthesized speech characteristics of the prior-synthesized speech of the context portion comprises:
- generating synthesized speech of the identified portion that is spoken at the adapted speech-pace, and with the pitch and prosody of the synthesized speech of the text of the identified portion continuous with the pitch and prosody of the synthesized speech of the text of the context portion both immediately before and immediately following the identified portion.

16. The system of claim 15, wherein the indicated motion of the tracking operation corresponds to real-time tracking of text in the identified portion at a tracking rate,
- and wherein generating the synthesized speech of the identified portion that is spoken at the adapted speech-pace, and with the pitch and prosody of the synthesized speech of the text of the identified portion continuous with the pitch and prosody of the synthesized speech of the text of the context portion both immediately before and immediately following the identified portion comprises:
- synthesizing speech of the identified portion that is spoken one language unit at a time, wherein each given spoken language unit of the identified portion is further spoken with pitch and prosody continuous with the pitch and prosody of synthesized speech of language units of the context portion that are both immediately before and immediately following the given spoken language unit of the identified portion,
- wherein each language unit is: a phoneme if the tracking rate is no greater than a first threshold rate, or a word if the tracking rate is greater than the first threshold rate and below a second threshold rate.

17. The system of claim 11, wherein concurrently displaying the text segment in the display device comprises:
- displaying the text of the identified portion with visual clarity and focus; and
- displaying the text of the text segment, other than the text of the identified portion, with visual defocusing, wherein visual defocusing comprises visual effects, the visual effects being at least one of fading or blurring or displaying with a different background or foreground color.

18. An article of manufacture including a non-transitory computer-readable storage medium having stored thereon program instructions that, upon execution by one or more processors of a system including a text-to-speech (TTS) system, cause the system to perform operations comprising:

while synthesizing speech from a text segment with the TTS system and concurrently displaying the text segment in a display device, receiving input indicating a position and motion of a tracking operation relative to the displayed text segment in the display device;

using the indicated position of the tracking operation to identify both a portion of the text segment undergoing TTS synthesis processing at a time proximate to when the tracking operation input is received, and a context portion of the text segment for which prior-synthesized speech has been synthesized at a canonical speech-pace by the TTS system, wherein the context portion includes text immediately before and immediately following the identified portion;

using the indicated motion of the tracking operation to adjust a speech-pace of TTS synthesis of the identified portion from the canonical speech-pace to an adapted speech-pace determined based on the indicated motion;

adapting speech characteristics of synthesized speech of the identified portion by applying to TTS synthesis processing of the identified portion both the adapted speech-pace and synthesized speech characteristics of the prior-synthesized speech of the context portion;

outputting the synthesized speech of the identified portion at the adapted speech-pace and with the adapted speech characteristics; and following outputting the synthesized speech of the identified portion at the adapted speech-pace and with the adapted speech characteristics, repeating output of the synthesized speech of the identified portion at the canonical speech-pace and with canonical speech characteristics in order to associate the repeated output with the synthesized speech at the adapted speech-rate and with the adapted speech characteristics.

19. The article of manufacture of claim 18, wherein applying to TTS synthesis processing of the identified portion both the adapted speech-pace and the synthesized speech characteristics of the prior-synthesized speech of the context portion comprises applying both the adapted speech-pace and the synthesized speech characteristics of the prior-synthesized speech of the context portion as feedback to TTS synthesis processing of the identified portion.

20. The article of manufacture of claim 18, wherein the operations further comprise:

synthesizing the prior-synthesized speech of the context portion during a time interval prior to synthesizing speech of the portion.

* * * * *